(12) United States Patent
Zmood et al.

(10) Patent No.: US 12,003,193 B2
(45) Date of Patent: Jun. 4, 2024

(54) COUPLED INDUCTORS INVERTER TOPOLOGY

(71) Applicant: Solaredge Technologies Ltd., Herzeliya (IL)

(72) Inventors: Daniel Zmood, Ness Ziona (IL); Ohad Fried, Ra'anana (IL); Omer Szlafsztein, Dafna (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/993,039

(22) Filed: Nov. 23, 2022

(65) Prior Publication Data

US 2023/0163696 A1 May 25, 2023

Related U.S. Application Data

(63) Continuation of application No. 17/148,322, filed on Jan. 13, 2021, now Pat. No. 11,557,983.
(Continued)

(51) Int. Cl.
*H02M 7/487* (2007.01)
*H02M 1/14* (2006.01)
(Continued)

(52) U.S. Cl.
CPC .............. *H02M 7/487* (2013.01); *H02M 1/14* (2013.01); *H02M 7/23* (2013.01); *H02M 7/483* (2013.01); *H02M 7/49* (2013.01); *H02M 7/5387* (2013.01)

(58) Field of Classification Search
CPC .......... H02M 1/14; H02M 7/23; H02M 7/483; H02M 7/487; H02M 7/49; H02M 7/497; H02M 7/5387
See application file for complete search history.

(56) References Cited

U.S. PATENT DOCUMENTS 9,293,248 B2 * 3/2016 Torres .................... H01F 38/00
9,960,708 B2    5/2018 Fu
(Continued)

FOREIGN PATENT DOCUMENTS

CN    105024575 A    11/2015
CN    105305860 A     2/2016
(Continued)

OTHER PUBLICATIONS

Jan. 13, 2023—EP Office Action—EP App. No. 21151774.3.
(Continued)

*Primary Examiner* — Gary L Laxton
(74) *Attorney, Agent, or Firm* — Banner & Witcoff, Ltd.

(57) ABSTRACT

A multi-level inverter topology is disclosed. A power converter circuit converts a DC source at its input to provide an alternating current (AC) at its output. The power converter circuit may have a controller operably attached to multiple series connections of switches. The controller may control one or more of the multiple series connections of switches to convert a DC input to provide multi-level AC voltages with DC offset across two terminals of the power converter circuit. The multi-level AC voltages with DC offset may then be converted by use of a plurality of series connections of switches to provide a single-phase AC voltage at a first output terminal with respect to at least one of a neutral potential, an earth potential, or a terminal of the power converter circuit.

20 Claims, 15 Drawing Sheets

Related U.S. Application Data

(60) Provisional application No. 62/961,377, filed on Jan. 15, 2020.

(51) Int. Cl.
  *H02M 7/23* (2006.01)
  *H02M 7/483* (2007.01)
  *H02M 7/49* (2007.01)
  *H02M 7/5387* (2007.01)

(56) References Cited

U.S. PATENT DOCUMENTS

| | | | |
|---|---|---|---|
| 10,972,010 | B2 | 4/2021 | Cheng |
| 11,159,097 | B2* | 10/2021 | Chen .................. H02M 7/537 |
| 2010/0226160 | A1 | 9/2010 | Prior et al. |
| 2014/0126259 | A1 | 5/2014 | Inoue |
| 2015/0062984 | A1* | 3/2015 | Hu .................. H02M 7/493 363/71 |
| 2015/0085541 | A1* | 3/2015 | Hu .................. H02M 7/5395 363/71 |
| 2016/0268923 | A1 | 9/2016 | Bremicker |
| 2016/0329811 | A1 | 11/2016 | Du et al. |
| 2017/0133947 | A1* | 5/2017 | Fu .................. H02M 1/0064 |
| 2018/0191270 | A1 | 7/2018 | Correa Vasquez et al. |
| 2019/0363644 | A1 | 11/2019 | Li et al. |
| 2019/0393802 | A1 | 12/2019 | Gao et al. |
| 2022/0278602 | A1 | 9/2022 | Erickson et al. |

FOREIGN PATENT DOCUMENTS

| | | |
|---|---|---|
| CN | 105703334 A | 6/2016 |
| EP | 3174190 A1 | 5/2017 |
| WO | 2015027693 A1 | 3/2015 |
| WO | 2019092305 A1 | 5/2019 |

OTHER PUBLICATIONS

Quan Zhongyi et al: "Multilevel Voltage—Source Converter Topologies With Internal Parallel Modularity", IEEE Transactions on Industry Applications, IEEE Service Center, Piscataway, NJ, US, Sep. 16, 2019.

Li Yuzhuo et al: "Systematic Synthesis and Derivation of Multilevel Converters Using Common Topological Structures With Unified Matrix Models", IEEE Transactions on Power Electronics, Institute of Electrical and Electronics Engineers, Oct. 21, 2019.

Jun. 4, 2021—European Search Report—EP 21151774.3.

Mar. 18, 2024—Summons to Oral Proceeding—EP App. No. 21151774.3.

\* cited by examiner

COUPLED INDUCTORS INVERTER
TOPOLOGY

CROSS-REFERENCE TO RELATED APPLICATIONS

This application is a continuation of and claims priority to U.S. patent application Ser. No. 17/148,322, filed Jan. 13, 2021, which is a non-provisional of and claims priority to U.S. Provisional Patent Application No. 62/961,377, filed Jan. 15, 2020, each of which is hereby incorporated by reference in its entirety.

BACKGROUND

A multilevel inverter is a power electronic device that is capable of providing a desired alternating current (AC) voltage level at its output. The desired AC voltage output is output by conversion of one or more input direct current (DC) voltage levels at the multilevel inverter input. A multilevel inverter with three or more output voltage levels may provide a combined voltage (Vout) at its output. Compared to an inverter with two levels of voltage combined together at its output, the combined voltage (Vout) of the multilevel inverter may have a lower differential change in voltage with respect to time. The lower differential change in voltage may therefore provide a lower harmonic distortion of the combined voltage (Vout). The lower harmonic distortion of the combined voltage (Vout) may therefore provide an increased smoothness of the combined voltage (Vout). Increased smoothness of the combined voltage (Vout) may be proportional to the increase in the number of output voltage levels. However, the smoother combined voltage (Vout) of the multilevel inverter may demand a controller with increased complexity. The increased number of output voltage levels may also further demand an increased number of components for the realization of the multilevel inverter. The increased number of components may include more switches when compared to the inverter with two levels of voltage combined together at its output. The inverter with two levels of voltage combined together at its output may require a controller with less complexity.

SUMMARY

The following summary is a short summary of some of the inventive concepts for illustrative purposes only, and is not intended to limit or constrain the inventions and examples in the detailed description.

Illustrative embodiments disclosed herein may be with respect to power sources in a power system, which may include the interconnection of various groups of power sources. Each group of power sources may contain different types of power derived from renewable energy sources and non-renewable energy sources. The renewable energy sources may be provided from photovoltaic (PV) systems, wind or wave power. Examples of non-renewable energy sources may include fuel used to drive turbines or generators, for example.

Illustrative embodiments disclosed herein may include a power system utilized to supply power to a load and/or a storage device. The power system may include various inter connections of groups of direct current (DC) power sources that also may be connected in various series, parallel, series parallel and parallel series combinations, for example. Some illustrative embodiments may involve the connection of DC sources to a power converter circuit to provide an alternating current (AC) on its output. The power converter circuit may be a multi-level inverter topology, which may include a pair of input terminals and a first series connection of a first capacitor and a second capacitor. The first series connection may be connected across the pair of input terminals. A connection of the first capacitor to the second capacitor may be at a first terminal. A second series connection may include a first switch, a second switch, a third switch and a fourth switch connected in series. The second series connection may be connected across the pair of input terminals. A connection of the first switch to the second switch may be at a second terminal. And a connection of the second switch to the third switch may be at a third terminal. A connection of the third switch to the fourth switch may be at a fourth terminal. The first terminal may connect to the third terminal.

A plurality of other series connections of two or more switches may be connected across the second terminal and the fourth terminal. Each of the plurality of other series connections of two or more switches may comprise an intermediate (e.g., central) node. A respective inductor may be coupled to each of the intermediate (e.g., central) nodes, connected between the intermediate node and a (e.g., output) terminal, configured to combine the voltages of the intermediate (e.g., central) node.

The (e.g., output) terminal configured to combine the voltages of the intermediate (e.g., central) nodes may be a single-phase output with respect to at least one of a neutral potential, an earth potential, or another terminal of the power converter circuit. The output terminal of the power converter circuit may be powered by converting a DC input voltage connected to the pair of input terminals to an AC output voltage.

Each of the respective inductors may have mutual inductance with at least one of the other inductors. The power converter circuit may further include a controller operably attached and configured to control, by pulse width modulated (PWM) signals, each of the switches of the second series connection, and each of the plurality of other series connections of two or more switches, which may be connected across the second terminal and the fourth terminal. The controller may be operable to convert, using the second series connection, a DC input voltage connected to the pair of input terminals to provide multi-level AC voltages with DC offset (with respect to at least one of the pair of input terminals) across the second terminal and the fourth terminal.

The controller may measure/sense the current flowing through the coupled inductors and may control, by changing the PWM signals, switches (e.g., MOSFETs/IGBTs) to balance the currents flowing through the inductors/legs.

In some aspects, the coupled inductors may be coupled to the output terminal through relays. The controller may use relays for connecting the power converter circuit (e.g., an inverter) to a grid/load. The relays may also function as a circuit breaker and/or a protective mechanism to prevent high current/voltage or unintentional feeding of the electrical device into a sub grid or a stand-alone grid, often referred to as an anti-islanding operation. Based on an interruption (e.g., the grid "going down") or a fault detection, the controller may operate the relays to disconnect the output terminal from the grid/load to ensure safety and to prevent damage to the electrical circuit or the grid.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 1 illustrates a diagram of an electrical circuit according to aspects of the disclosure.

DETAILED DESCRIPTION

Figure 1:
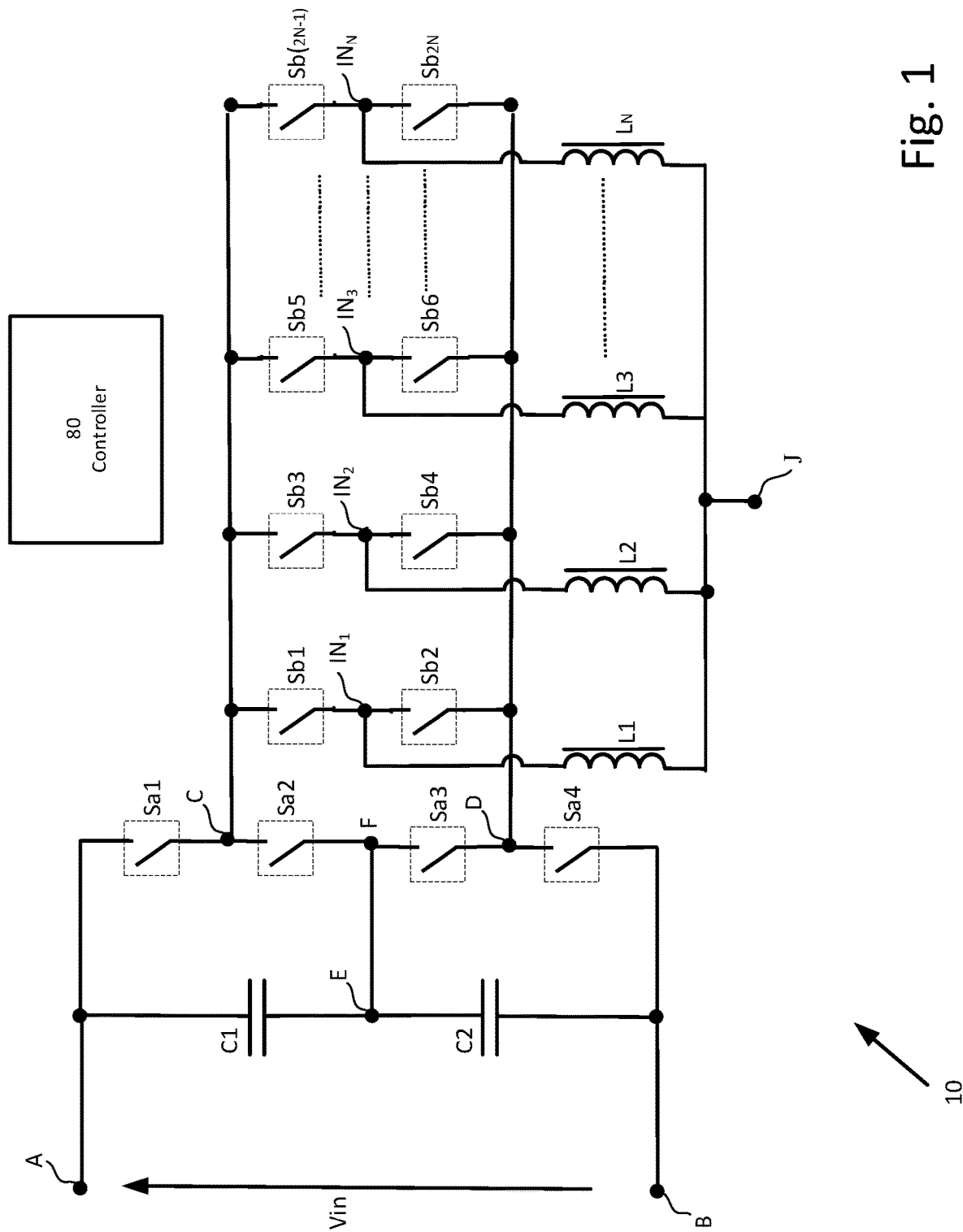

In the following description of various aspects of the disclosure, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Features of one or more aspects disclosed herein may relate to a power converter circuit (e.g., multilevel inverter). The power converter circuit may be capable of providing a desired alternating current (AC) voltage level at its output from direct current (DC) voltage applied to its input. The power converter circuit may be realized by a multi-level inverter circuit topology. The desired AC voltage output is output from conversion of multiple DC voltage levels via an intermediate converter included in the multi-level inverter circuit topology.

The term "PWM" as used herein is with respect to the operation of switches described below. Unless otherwise stated, the term "PWM" refers to an active use of a switch for a period of time. The active use of the switch during the period of time may include the switch being opened and closed repeatedly during the time period. The term "ON" as used herein with respect to the operation of switches described below, refers to the active use of a switch during a time period. When a switch is "ON", the switch remains substantially closed for an "ON" time period. The term "OFF" as used herein is with respect to the operation of switches described below and refers to active use of a switch during the time period. When a switch is "OFF", the switch remains substantially open for an "OFF" time period.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches, for example.

The claim terms "comprise", "comprises" and/or "comprising" as used herein in the claims section finds support in the description with use of the terms "may", "include", "includes" "including", etc.

The terms, "substantially", and, "about", used herein include variations that are equivalent for an intended purpose or function (e.g., within a permissible variation range). Certain ranges are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

All values are examples, and are not meant to be taken as limiting. Also, all given values include values that are substantially equal to the given values. For example, a given value of 100 A can include any value that would be operationally equivalent, e.g., about 99.5 A, 101 A, 98.5 A, etc.

Reference is made to FIG. 1, which illustrates a circuit diagram of a power converter circuit 10 according to illustrative aspects of the disclosure. FIG. 1 provides an example of a multi-level inverter circuit topology. Thus, in the example embodiment of FIG. 1, the power converter circuit 10 is an example of a multilevel inverter. A direct current (DC) input voltage Vin may be applied across input terminals A and B. Input voltage Vin may be a DC voltage received from one or more DC power sources, e.g. a battery, a photovoltaic panel, a rectified source of alternating current (AC) from an AC generator, etc.

In some aspects, power converter circuit 10 may comprise a controller 80, for example: a digital signal processing (DSP) circuit, a field programmable gate array (FPGA) device, etc. Controller 80 may control power converter circuit 10 and its components (for example, switches, voltages, etc.) based on a predetermined algorithm, a measured parameter (e.g., a measurement collected by one or more sensors), a calculated parameter, determined or estimated (e.g., based on one or more measured parameters) parameter, any other appropriate data, etc. As an example, the electrical parameter may be: current, voltage, power, frequency, etc. In some aspects, controller 80 may comprise sensors to measure or sense one or more electrical parameters.

A series connection of capacitors C1 and C2 may be connected across input terminals A and B. In some aspects, capacitors C1 and C2 may be replaced by a plurality of series and/or parallel connected capacitors. Node E may be the point of connection between capacitors C1 and C2 (e.g., intermediate node). Node E may be coupled to neutral and/or earth potential.

A series connection of switches Sa1, Sa2, Sa3 and Sa4 may also be connected across input terminals A and B. A first terminal of switch Sa1 may be coupled to input terminal A and a second terminal of switch Sa1 may be coupled to node C. A first terminal of switch Sa2 may be coupled to node C and a second terminal of switch Sa2 may be coupled to node F. Node F may be coupled to node E directly so that Nodes E and F have the same electric potential. A first terminal of switch Sa3 may be coupled to node F and a second terminal of switch Sa3 may be coupled to node D. A first terminal of switch Sa4 may be coupled to node D and a second terminal of switch Sa4 may be coupled to input terminal B.

A plurality of series connections of two or more switches may be connected across nodes C and D. For example, circuit 10 of FIG. 1 comprises N (e.g., N≥2) series connections of two switches, such that each one the series connections are coupled in parallel with respect to each other. A series connection of switches Sb1 and Sb2 may be connected across nodes C and D. A terminal of Sb1 and a terminal of Sb2 may be coupled to intermediate (e.g., central) node $IN_1$. As shown in FIG. 1, intermediate node $IN_1$ is a central node between two of the switches (Sb1 and Sb2) belonging to one of the series connections. If the series connection had three switches, intermediate node $IN_1$ could be the node between the first and second switches or between second and third switches. A series connection of switches Sb3 and Sb4 may also be connected across nodes C and D. A terminal of Sb3 and a terminal of Sb4 may be coupled to intermediate node $IN_2$. A series connection of switches Sb5 and Sb6 may also be connected across nodes C and D. A terminal of Sb5 and a terminal of Sb6 may be coupled to intermediate node $IN_3$. A series connection of switches $Sb_{(2N-1)}$ and $Sb_{2N}$ may also be connected across nodes C and D. A terminal of $Sb_{(2N-1)}$ and a terminal of $Sb_{2N}$ may be coupled to intermediate node $IN_N$.

A corresponding first terminal of inductors L1, L2, L3 ... $L_N$ may be coupled to node J (e.g., an output terminal) and a corresponding second terminal of inductors L1, L2, L3 ... $L_N$ may be coupled respectively to terminals $IN_1, IN_2, IN_3 ... IN_N$. Terminal J may combine the voltages of the output legs. In some aspects, terminal J may be an output terminal of power converter circuit 10 that may output an AC sine wave (e.g., with DC offset). For example, terminal J may be an output terminal of one phase in a single-phase/three-phase/multi-phase converter. Inductors L1, L2, L3 ... $L_N$ may be mutually coupled together. Inductors L1, L2, L3 ... $L_N$ may be utilized to smooth a sine-wave of an AC output of power converter circuit 10.

Controller 80 may control switches Sa1, Sa2, Sa3 and Sa4. Switches Sa1, Sa2, Sa3 and Sa4 may be switched at a first frequency. The first frequency may be the output frequency (e.g., grid frequency, load frequency, utility frequency, (power) line frequency, 50 Hz-60 Hz, etc.). Switches Sa1 and Sa3 may be closed/turned ON/conducting substantially at the same time, and may be open/turned OFF/non-conducting substantially at the same time (e.g., switches Sa1 and Sa3 may be controlled in a corresponding manner, for example, based on a common control signal). Switches Sa2 and Sa4 may be closed/turned ON/conducting substantially at the same time, and may be open/turned OFF/non-conducting substantially at the same time (e.g., switches Sa2 and Sa4 may be controlled in a corresponding manner, for example based on a common signal) and in a complementary manner with regard to switches Sa1 and Sa3 (e.g., when switches Sa1 and Sa3 are closed, Sa2 and Sa4 may be open).

Controller 80 may control switches Sb1, Sb2, Sb3, Sb4, Sb5, Sb6 ... $Sb_{(2N-1)}$, $Sb_{2N}$. Switches Sb1, Sb2, Sb3, Sb4, Sb5, Sb6 ... $Sb_{(2N-1)}$, $Sb_{2N}$ may be switched at a second frequency. The second frequency may be higher than the first frequency. Switch Sb1 may be switched in a complementary manner with regard to switch Sb2. For example, switch Sb1 may be closed/turned ON/conducting when switch Sb2 is open/turned OFF/non-conducting, and switch Sb1 may be open/turned OFF/non-conducting when switch Sb2 is closed/turned ON/conducting. Switch Sb3 may be switched in a complementary manner with regard to switch Sb4. Switch Sb5 may be switched in a complementary manner with regard to switch Sb6. Switch $Sb_{(2N-1)}$ may be switched in a complementary manner with regard to switch $Sb_{2N}$. Also, in an embodiment with more than two switches in any one series connection, two or more of the switches may be switched (like $Sb_{(2N-1)}$) in a complementary manner with regard to the remaining switches of that series connection (like $Sb_{2N}$). In some aspects, switches Sb1, Sb3, Sb5 ... $Sb_{2N}$ may be switched in a phase-shifted manner. For generalization, in a circuit comprising a plurality of N series connections of two or more switches, each series connection may be switched with phase-shift of 360°/N with respect to each other. For example, where N=3 the switches may be switched with phase-shift of 120°.

For example, the switches of power converter circuit 10 of FIG. 1 (Sa1, Sa2, Sa3, Sa4, Sb1, Sb2, Sb3, Sb4, Sb5, Sb6 ... $Sb_{(2N-1)}$, $Sb_{2N}$) may be insulated gate bipolar transistors (IGBTs), metal oxide semiconductor field effect transistors (MOSFETs), bipolar junction transistors (BJTs), field effect transistors (FETs), silicone-controlled rectifiers (SCRs) or any known solid-state switch, or any combination of these components.

In some aspects, switches Sb1, Sb2, Sb3, Sb4 Sb5, Sb6 ... $Sb_{(2N-1)}$, $Sb_{2N}$ may be switched according to the duty cycle ratio (which may be changed according to a comparison between a reference voltage and the output voltage Vout), where each group (e.g., pair) of series-connected switches (e.g., where Sb1-Sb2 is the first pair, Sb3-Sb4 is the second pair, Sb5-Sb6 is the third pair ... and $Sb_{(2N-1)}$-$Sb_{2N}$ is the $n^{th}$ pair) is shifted sequentially by 1/N (where N is the number of series connections) of the switching period with respect to the other groups (e.g., pairs) of series-connected switches. The specific timing shown in FIGS. 3-4 may be an example of the desired duty cycles, but a variety of different timings may be used that may have similar or different switching performance.

Figure 2:
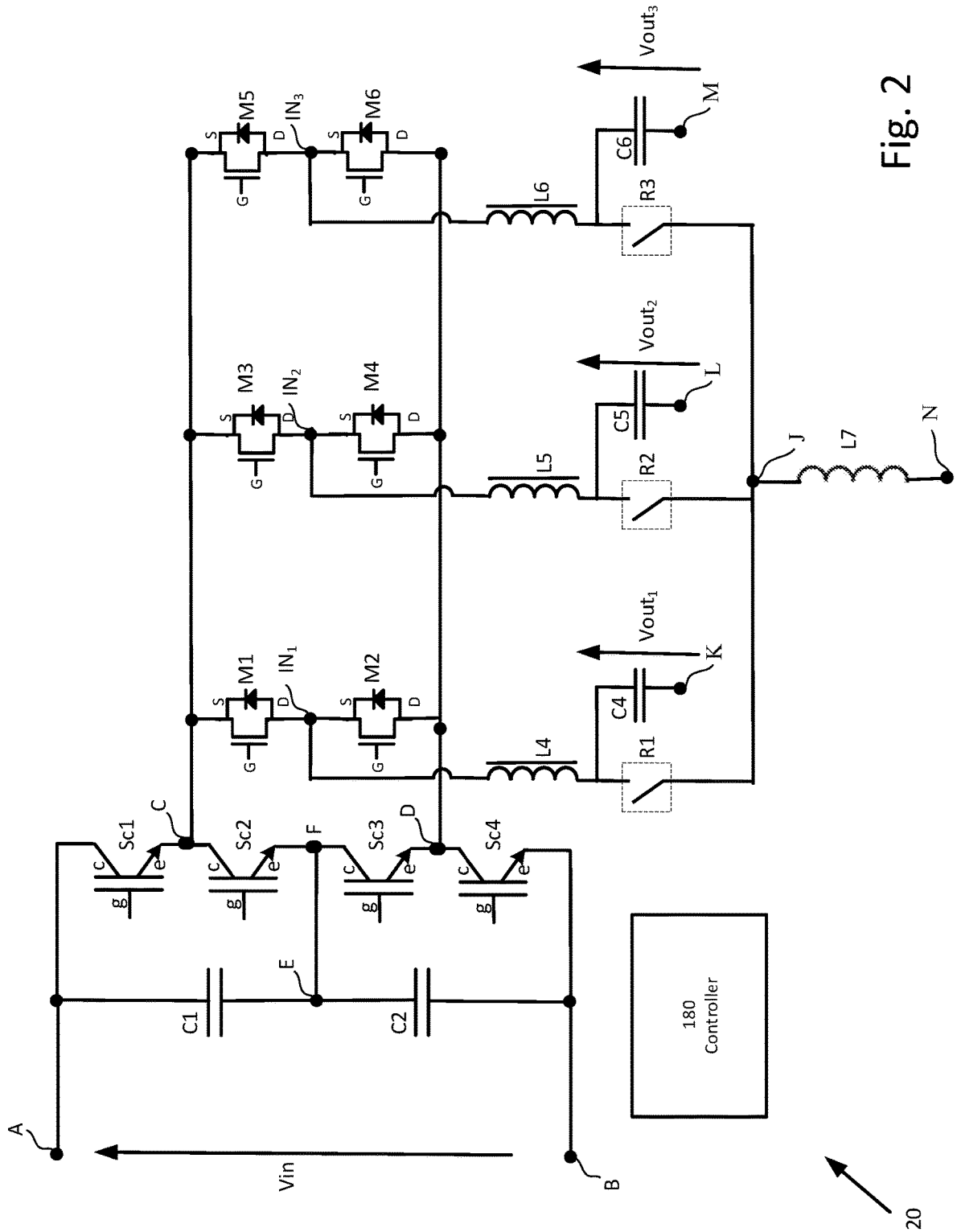
FIG. 2 illustrates a diagram of an electrical circuit according to aspects of the disclosure.

Reference is now made to FIG. 2, which illustrates a diagram of electrical circuit 20 (e.g., multilevel inverter), an example of power converter circuit 10 of FIG. 1, according to aspects of the disclosure. In FIG. 2, inductors L1, L2, L3 of FIG. 1 may be replaced by mutually coupled inductors L4, L5, L6. Controller 80 of FIG. 1 may be replaced by controller 180.

As shown in FIG. 2, in some aspects, switches Sa1, Sa2, Sa3 and Sa4 of FIG. 1 are insulated gate bipolar transistors (IGBTs).

For example, electrical circuit 20 comprises IGBTs Sc1, Sc2, Sc3 and Sc4. Controller 180 may control the gate (g) of IGBTs Sc1, Sc2, Sc3 and Sc4. The collector (c) of IGBT Sc1 may be coupled to input terminal A. At node C, the emitter (e) of IGBT Sc1 may be coupled to the collector (c) of IGBT Sc2. At node F, the emitter (e) of IGBT Sc2 may be coupled to the collector (c) of IGBT Sc3. Node F may be coupled to node E. At node D, the emitter (e) of IGBT Sc3 may be coupled to the collector (c) of IGBT Sc4. The emitter of IGBT Sc4 may be coupled to input terminal B.

As shown in FIG. 2, in some aspects, switches Sb1, Sb2, Sb3, Sb4, Sb5, Sb6 of FIG. 1 are metal oxide semiconductor field effect transistors (MOSFETs).

FIG. 2 also shows that the number N of series connections of two or more switches may be three (e.g., N=3). Accordingly, the three series connections including switches Sb1, Sb2, Sb3, Sb4, Sb5, Sb6 in FIG. 1 are replaced by six MOSFETs M1, M2, M3, M4, M5 and M6 in FIG. 2. Controller 180 may control each one of MOSFETs M1, M2, M3, M4, M5 and M6. Each one of MOSFETs M1, M2, M3, M4, M5 and M6 may be an n-type enhancement metal-oxide-semiconductor field-effect transistor comprising drain, source and gate terminals (denoted D, S and G respectively). In this example, controller 180 may control the voltage difference between the source and gate terminals of MOSFETs M1, M2, M3, M4, M5 and M6.

The source terminals (S) of MOSFETs M1, M3 and M5 may be coupled to node C. At node $IN_1$ the drain terminal (D) of MOSFET M1 may be coupled to the source terminal (S) of MOSFET M2. At node $IN_2$ the drain terminal (D) of MOSFET M3 may be coupled to the source terminal (S) of MOSFET M4. At node $IN_3$ the drain terminal (D) of MOSFET M5 may be coupled to the source terminal (S) of MOSFET M6. The drain terminals (D) of MOSFETs M2, M4 and M6 may be coupled to node D.

In some aspects of the disclosure herein, controller 180 may operate MOSFETs M1, M2, M3, M4, M5 and M6 at a first frequency (e.g. high frequency), based on a modulation scheme that may include pulse width modulation (PWM), frequency modulation (FM), or a variable frequency plus variable pulse width modulation, for example. The modulation scheme may optimize spectrum and reduce ripple based on space vector (SV) modulation, types of phase disposition (PD) modulation, alternate phase opposition disposition (APOD) modulation, various multicarrier PWM strategies for multilevel inverters, etc. Controller 180 may operate IGBTs Sc1, Sc2, Sc3 and Sc4 at a second frequency (e.g. low frequency). The second frequency may be the load frequency, utility frequency, (power) line frequency, etc. In some aspects, the first frequency may be higher than the second frequency. For example, the first frequency may be 500 Hz, 1 kHz, 5 kHz, 25 kHz, 100 kHz, 500 kHz, 1 MHz, etc. and the second frequency may be 50 Hz, 60 Hz, 500 Hz, etc.

In some aspects of the disclosure herein, mutually coupled inductors L4, L5, L6 may be coupled to terminal J optionally through additional circuit elements. Terminal J may combine the voltages at the output of the legs of (e.g., filter) inductors L4, L5, L6. For example, in FIG. 2, coupled inductors L4, L5, L6 may be coupled to terminal J through relays R1, R2 and R3, respectively. In some aspects, a (e.g., filter) capacitor may be coupled to one terminal of mutually coupled inductors L4, L5, L6 (e.g., the terminal of the inductors L4, L5, and L6 that is coupled with relays R1, R2 and R3, respectively). For example, in FIG. 2, capacitor C4 may be coupled between a terminal of inductor L4 and node K, capacitor C5 may be coupled between a terminal of inductor L5 and node L, and capacitor C6 may be coupled between a terminal of inductor L6 and node M. Nodes K, L, M may be coupled to nodes having a different voltage levels or to one or more nodes having a same voltage level. Further, one or more of nodes K, L, M may be coupled to a node of electrical circuit 20 having a reference voltage (e.g., node E) or another node having another voltage reference, such as neutral and/or earth potential. In FIG. 2, inductor L7 (e.g., differential filter) may be coupled/connected between terminal J and node N. A single-phase AC output/sine wave with DC offset of power converter circuit 10 may be provided across capacitors C4, C5 and C6. An AC output voltage Vout may be applied across capacitors C4, C5 and C6. AC output voltages Vout1, Vout2, and Vout3 may be applied across capacitors C4, C5, and C6, respectively. AC output voltages Vout1, Vout2, and Vout3 may be similar at the second frequency and phase shifted at the first frequency by 120°.

In some aspects, capacitors C4, C5 and C6 may be replaced by a capacitor (or a plurality of capacitors) connected between terminal J and a reference terminal (e.g., node E).

In aspects of the disclosure herein, one or more of relays R1, R2 and R3 may comprise two or more relay contacts that may be provided using a multi-pole relay module. A multi-pole relay module incorporates a plurality of relays in a single package. A multi-pole relay module may enable the use of a common control coil for more than one relay contact, thereby reducing the size and the costs of the system. For example, a dual-pole relay module may have two contacts controlled by a single control coil so that a second control coil is not required, thereby reducing the relay array size, the dissipated energy during operation, the manufacturing costs, and/or the like.

In aspects of the disclosure herein, one or more of relays R1, R2 and R3 may use a different electrical contact configuration (e.g., single-pole single-throw (SPST), single-pole double-throw (SPDT), double-pole single-throw (DPST)). For example, when the relay array comprises two or more relays, using a DPST relay (e.g., a pair of switches or relays actuated by a single coil) may reduce the consumed energy for driving the control coils of the relay.

In some aspects of the disclosure, controller 180 may measure/sense or receive estimations and/or determinations (e.g., measurements collected by sensors) and/or data, of one or more electrical parameters of circuit 20. For example, controller 180 may measure/sense the current flowing through each one of inductors L4, L5, L6. The current measurement/sensing of the current flowing through the coupled inductors L4, L5, L6 may be used, by controller 180, to balance the leg (e.g., inductors L4, L5, L6) currents. The current balance may be achieved by changing the PWM signals that may control the switches/MOSFETs/IGBTs. Current balance between the legs (e.g., inductors L4, L5, L6) may divide/split/control the output current of electrical circuit 20 in a substantially equal way between each of the output legs/inductors L4, L5, L6. By virtue of the current balance between the legs, each of relays R1, R2 and R3 may be configured to conduct a lower peak current than if the leg currents were not balanced, thereby reducing the size and the costs of the system. For example, in a case where the output current of electrical circuit 20 is rated to a current at level of 30A, the current balance may ensure that a current of no more than 10A is flowing through each of the relays R1, R2 and R3. Thus, a configuration of the electrical circuit 20 using lower-rated relays may be enabled by virtue of the current balance.

In some aspects of the disclosure, controller 180 may measure the current flowing through coupled inductors L4, L5, L6 (e.g., differential current) and L7, voltage across capacitors C4, C5, C6, C1, and C2, etc. Based on detection of a differential current above a predetermined level, controller 180 may vary its control to amend the differential current (e.g., by changing the PWM signals).

Controller 180 may use relays R1, R2 and R3 for connecting electrical circuit 20 (e.g., an inverter, a power converter) to a grid/load. The relays R1, R2 and R3 may also function as a circuit breaker and/or a protective mechanism to prevent high current/voltage or unintentional feeding of the electrical device into a sub grid or a stand-alone grid, often referred to as an anti-islanding operation. Based on an interruption (e.g., the grid "going down") or a fault detection, relays R1, R2 and R3 may disconnect electrical circuit 20 from the grid/load to ensure safety and to prevent damage to electrical circuit 20 or the grid. Relays R1, R2 and R3 may be coupled with the outputs of or incorporated into electrical circuit 20.

Figure 3:
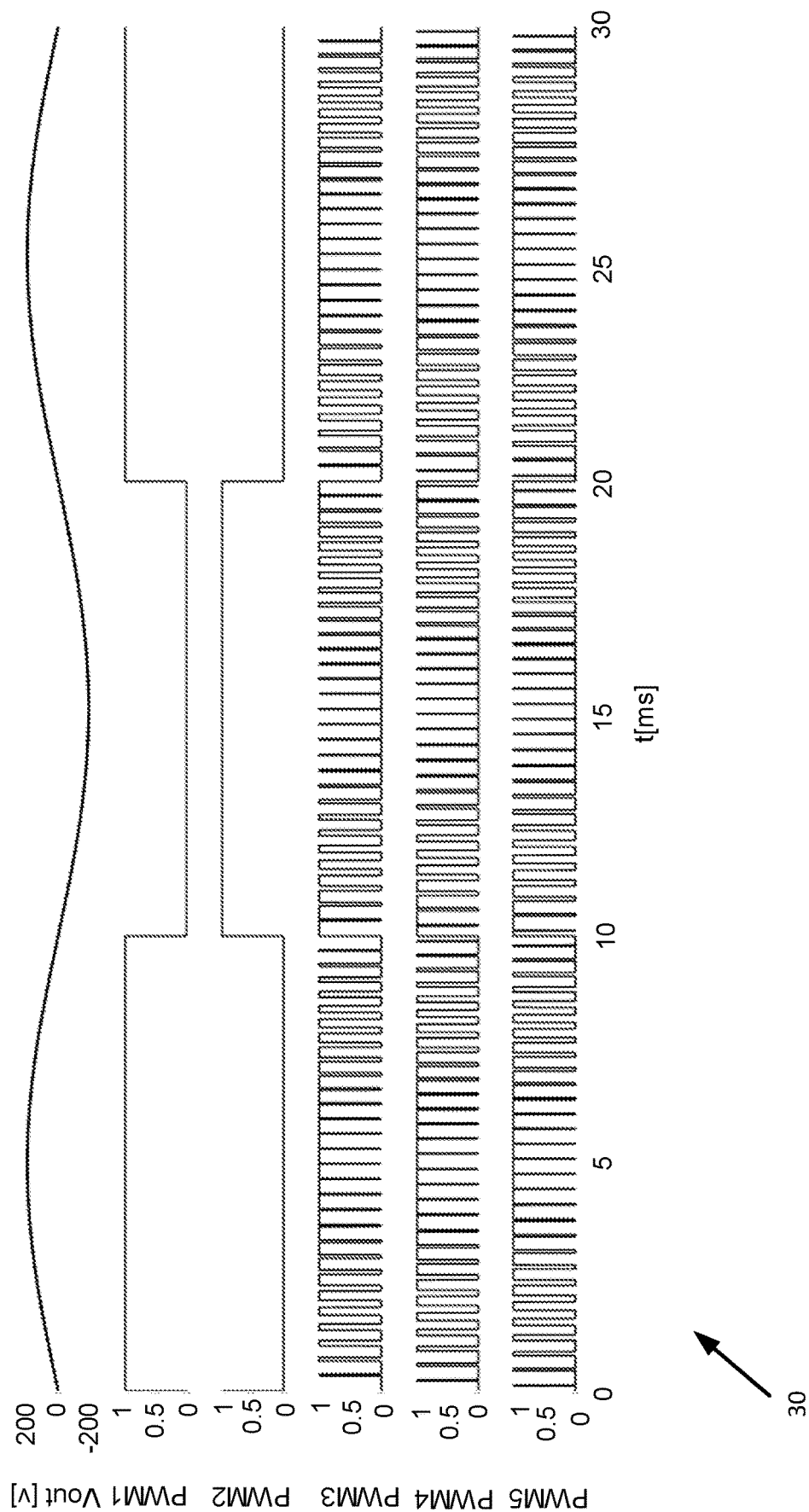
FIG. 3 illustrates a timing diagram of an electrical circuit according to aspects of the disclosure.

Reference is now made to FIG. 3, which illustrates timelines 30 showing waveforms that describe, according to some aspects of the disclosure, a possible control method of a power converter circuit (e.g., power converter circuit 10 and electrical circuit 20 of FIGS. 1 and 2 respectively). The upper graph shows a waveform, in volts (V) versus time, for output voltage Vout. Output voltage Vout may be any one of AC output voltages Vout1, Vout2, and Vout3 of FIG. 2, with respect to a reference voltage (e.g., node E, neutral potential terminal, an earth potential terminal). Output voltage Vout in FIG. 3 may be the output power of power converter circuit 10 and electrical circuit 20 of FIGS. 1 and 2, respectively. In some aspects, Vout may be filtered by a filter circuit comprising a capacitor to generate a substantially AC sinusoidal voltage waveform at the output of the filter circuit. In the example shown in FIG. 3, output voltage Vout may be a 50 Hz sine-waveform of $230V_{RMS}$. Graphs PWM1, PWM2, PWM3, PWM4 and PWM5 may represent PWM control signals used to control switches of the power converter circuit. The PWM1, PWM2, PWM3, PWM4 and PWM5 signals may be generated by digital encoding component(s) (e.g., a microprocessor) and/or analog circuit(s) (e.g., using a comparator, oscillator, etc.). For example, PWM1, PWM2, PWM3, PWM4 and PWM5 signals may be generated by controller 80 of FIG. 1 or controller 180 of FIG. 2.

In the example shown in FIG. 3, signals PWM1 and PWM2 may be relative to the frequency of output voltage Vout, e.g., 50 Hz. Signals PWM1 and PWM2 may be complementary with respect to each other. For example, signal PWM1 may be applied to control switches Sa1/Sa3 of FIG. 1 and/or the gate terminals (g) of IGBTs Sc1/Sc3 of FIG. 2. Signal PWM2 may be applied to control switches Sa2/Sa4 of FIG. 1 and/or the gate terminals (g) of IGBTs Sc1/Sc3 of FIG. 2.

In the example shown in FIG. 3, signals PWM3, PWM4 and PWM5 may be configured to control switches to be switched all during the same cycle. For example, signal PWM3 may control the gate terminal (G) of MOSFET M1 of FIG. 2, signal PWM4 may control the gate terminal (G) of MOSFET M3 of FIG. 2, and signal PWM5 may control the gate terminal (G) of MOSFET M5 of FIG. 2. A complementary PWM signal with respect to signal PWM3 may control the gate terminal (G) of MOSFET M2 of FIG. 2, a complementary PWM signal with respect to signal PWM4 may control the gate terminal (G) of MOSFET M4 of FIG. 2, and a complementary PWM signal of signal PWM5 may control the gate terminal (G) of MOSFET M6 of FIG. 2.

In the example, signals PWM3, PWM4 and PWM5 may control each of the switches/MOSFETs to be switched at 3 kHz. This allows each switch/MOSFET to turn ON for a period, according to the duty cycle ratio (which may be changed according to a comparison between a reference voltage and the output voltage Vout), where each of the signals PWM3, PWM4 and PWM5 may be shifted sequentially by 1/N (where N is the number of series connections of switches/MOSFETs (for example, MOSFETs M1-M2, MOSFETs M3-M4, MOSFETs M5-M6), which in the example shown in FIG. 3 is three (N=3)) of the switching period, such as ⅓ kHz or around 333.33 microseconds. During this time each switch turns ON and OFF. This may effectively increase the effective frequency to 3 times the switching period at the output terminal (e.g., terminal J of FIG. 2) of the power converter circuit 10 or electrical circuit 20 of FIGS. 1 and 2, respectively, without actually increasing the switching frequency. However, in embodiments described herein, the MOSFETs may be switched at a much higher rate (e.g., 200 kHz).

Further, the design may be scalable in that the effective frequency can be increased more and more by increasing the number of series connections of switches; the multi-level switching in each series connections of switches allows the switching to increase an effective frequency (e.g., relative to the switching frequency) of the current flowing through the differential filter (e.g., inductor L7 of FIG. 2) without driving a single MOSFET faster. Signals PWM1 and PWM2 may be complementary with respect to each other. For example, signal PWM1 may be applied to control switches Sa1/Sa3 of FIG. 1 and/or the gate terminals (g) of IGBTs Sc1/Sc3 of FIG. 2. Signal PWM2 may be applied to control switches Sa2/Sa4 of FIG. 1 and/or the gate terminals (g) of IGBTs Sc2/Sc4 of FIG. 2.

Figure 4:
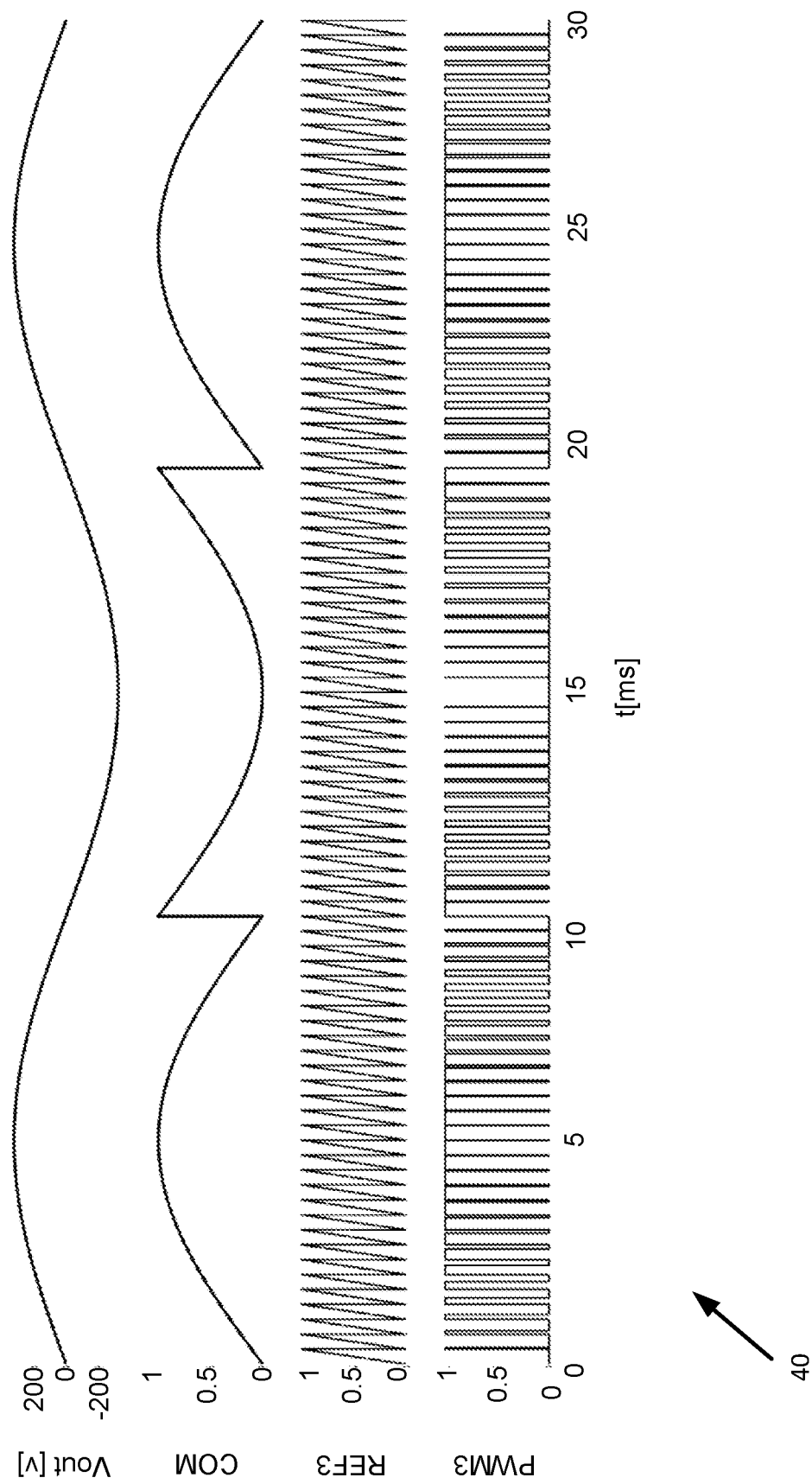
FIG. 4 illustrates a timing diagram of an electrical circuit according to aspects of the disclosure.

Reference is now made to FIG. 4, which illustrates timelines showing waveforms that describe, according to some aspects of the disclosure, a possible method of generating a pulse width modulation (PWM).

The example shown in FIG. 4, illustrates timelines 40 describing a possible method of generating a pulse width modulation (PWM) signal PWM3 of FIG. 3.

The upper graph shows a waveform, in volts (V) versus time, for output voltage Vout. Output voltage Vout may be any one of AC output voltages Vout1, Vout2, and Vout3 of FIG. 2, with respect to a reference voltage (e.g., node E, neutral potential terminal, an earth potential terminal) and equivalent with Vout shown in FIG. 3. Output voltage Vout may be the output power of power converter circuit 10 and electrical circuit 20 of FIGS. 1 and 2, respectively. In some aspects, Vout may be filtered by a filter circuit comprising a capacitor to generate a substantially AC sinusoidal voltage waveform at the output of the filter circuit. In the example shown in FIG. 4, output voltage Vout may be a 50 Hz sine-waveform of $230V_{RMS}$.

The second graph from the top of FIG. 4 may represent a reference signal COM corresponding to (e.g., related to) output voltage Vout. During the positive half of the sine-wave Vout, reference signal COM may be similar to output voltage Vout (e.g., a sine wave with substantially the same frequency but with a different amplitude). During the negative half of the sine-wave Vout, reference signal COM may be complementary to output voltage Vout. For example, reference signal COM may be equivalent with 1−(Vout/Vamp), where Vamp is the peak amplitude of sine-wave Vout.

The third graph from the top of FIG. 4 may represent another reference signal REF3 used to compare with the reference signal COM. In some aspects, REF3 may be a saw tooth wave (or saw wave). In the example, the saw tooth wave REF3 may have a frequency of 3 kHz.

The lower graph shows PWM control signal PWM3 used to control a switch(s) of the power converter circuit. For example, signal PWM3 may control switch Sb1 of FIG. 1 and/or the gate terminal (G) of MOSFET M1 of FIG. 2 and may be equivalent with control signal PWM3 of FIG. 3. Control signal PWM3 may be generated by digital encoding component(s) (e.g., a microprocessor) and/or analog circuit(s) (e.g., using a comparator, oscillator, etc.). In this example control signal PWM3 may be generated by a comparator receiving reference signals COM and REF3 as inputs. Where reference signal COM is larger than reference signal REF3, control signal PWM3 may be '1' indicating an 'ON' state. Where reference signal COM is smaller than reference signal REF3, control signal PWM3 may be '0' indicating an 'OFF' state.

The PWM control signal PWM3 may be generated by digital encoding component(s) (e.g., a microprocessor) and/or analog circuit(s) (e.g., using a comparator, oscillator, etc.). For example, PWM control signal PWM3 signals may be generated by controller 80 of FIG. 1 or a similar one.

Figure 5:
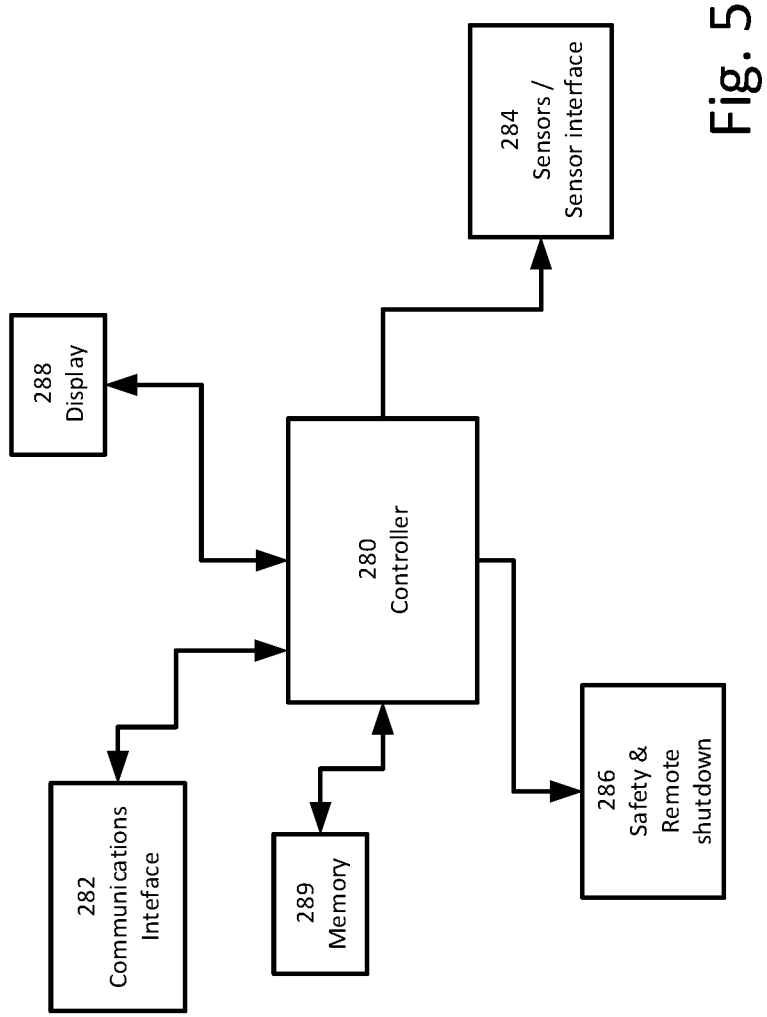
FIG. 5 illustrates a block diagram according to aspects of the disclosure.

Reference is now made to FIG. 5, which illustrates a block diagram of a controller according to aspects of the disclosure herein. Controller 80 of FIG. 1 and/or controller 180 of FIG. 2 may be implemented with controller 280. A controller 280 may include at least one of a microprocessor, microcontroller, digital signal processor (DSP), or the like. Controller 280 may be connected to a memory 289. Controller 280 may serve as a central controller to other similar controllers as controller 280 which may be included to control multiple interconnected power converter circuits (e.g., a plurality of power converter circuits 10 for example). Communications interface 282 connected to controller 280 may provide communications between controller 280 and other controllers (and other communication interfaces) included generally in a power system, which includes power converter circuit 10. The communications to and from communications interface 282 may be based on a control algorithm running on controller 280. The communications may include control signals provided on control lines which operably connect to and control power converter circuit 10. For example, controller 280 may generate control signals to control the switches of power converter circuit 10 of FIG. 1 (Sa1, Sa2, Sa3, Sa4, Sb1, Sb2, Sb3, Sb4, Sb5, Sb6 . . . $Sb_{(2N-1)}$, $Sb_{2N}$) and/or the IGBTs and MOSFETs of power converter circuit 10 of FIG. 1 (IGBTs Sc1, Sc2, Sc3 and Sc4 and MOSFETs M1, M2, M3, M4, M5 and M6).

Communications through communications interface 282 may also include measured and/or sensed parameters via sensors/sensor interface 284 that, for example, may be included in power converter circuit 10 of FIG. 1. The communications by communications interface 282 may be conveyed using WiFi, power line communications (PLC), near field communications or a RS232/485 communication bus, for example. Communications interface 282 may communicate with a local area network or cellular network in order to establish an internet connection. For example, the internet connection may provide a feature of remote monitoring or reconfiguration of power converter circuit 10.

A display 288 connected to central controller 280 may be mounted on the surface of the housing used to house power converter circuit 10 for example. Display 288 may display for example the power produced from power converter circuit 10. Controller 280 may be connected to a shutdown device 286 (e.g., a safety and remote shutdown device). Sensing by sensor(s)/sensor interface 284 as well as sensed parameters communicated between controller 280 and sensor(s)/sensor interfaces of power converter circuit 10 may be indicative of a fault condition (e.g., overvoltage, overcurrent, ground fault, failure of components, input power or load disconnection). Upon detection of the fault condition, shutdown device 286 may be activated in order to isolate the fault condition and/or shutdown power converter circuit 10. For example, in such a case, controller 180 of FIG. 2 may turn OFF relays R1, R2 and R3.

Control signals from controller 280 applied to the switches of power converter circuit 10 of FIG. 1 (Sa1, Sa2, Sa3, Sa4, Sb1, Sb2, Sb3, Sb4, Sb5, Sb6 . . . $Sb_{(2N-1)}$, $Sb_{2N}$) and/or the IGBTs and MOSFETs of electrical circuit 20 of FIG. 2 (IGBTs Sc1, Sc2, Sc3 and Sc4 and MOSFETs M1, M2, M3, M4, M5 and M6) are generated using a modulation scheme. The modulation scheme may be responsive to the electrical parameters sensed in power converter circuit 10 when power converter circuit 10 may or might not be connected to a load. The load may be an AC motor or a utility grid supply for example. The modulation scheme may include pulse width modulation (PWM), frequency modulation (FM), or a variable frequency plus variable pulse width modulation, for example. An algorithm of controller 280 may allow application of control signals. The control signals may be applied responsive to a sensing step of an algorithm to sense the electrical parameters in power converter circuit 10 connected to a load and/or when power converter circuit 10 is not connected to a load. For example, sensor(s)/sensor interface 284 may sense/measure the current flowing through the output legs/mutually coupled inductors L4, L5, L6. The load may be a utility grid, for example.

In some aspects of the disclosure herein, controller 280 of FIG. 5 may be implemented as an independent circuit or component. The implementation may be digital (e.g. using a microprocessor), analog (e.g. using an integrator), or both (e.g., using a digital-analog converter).

Figure 6:
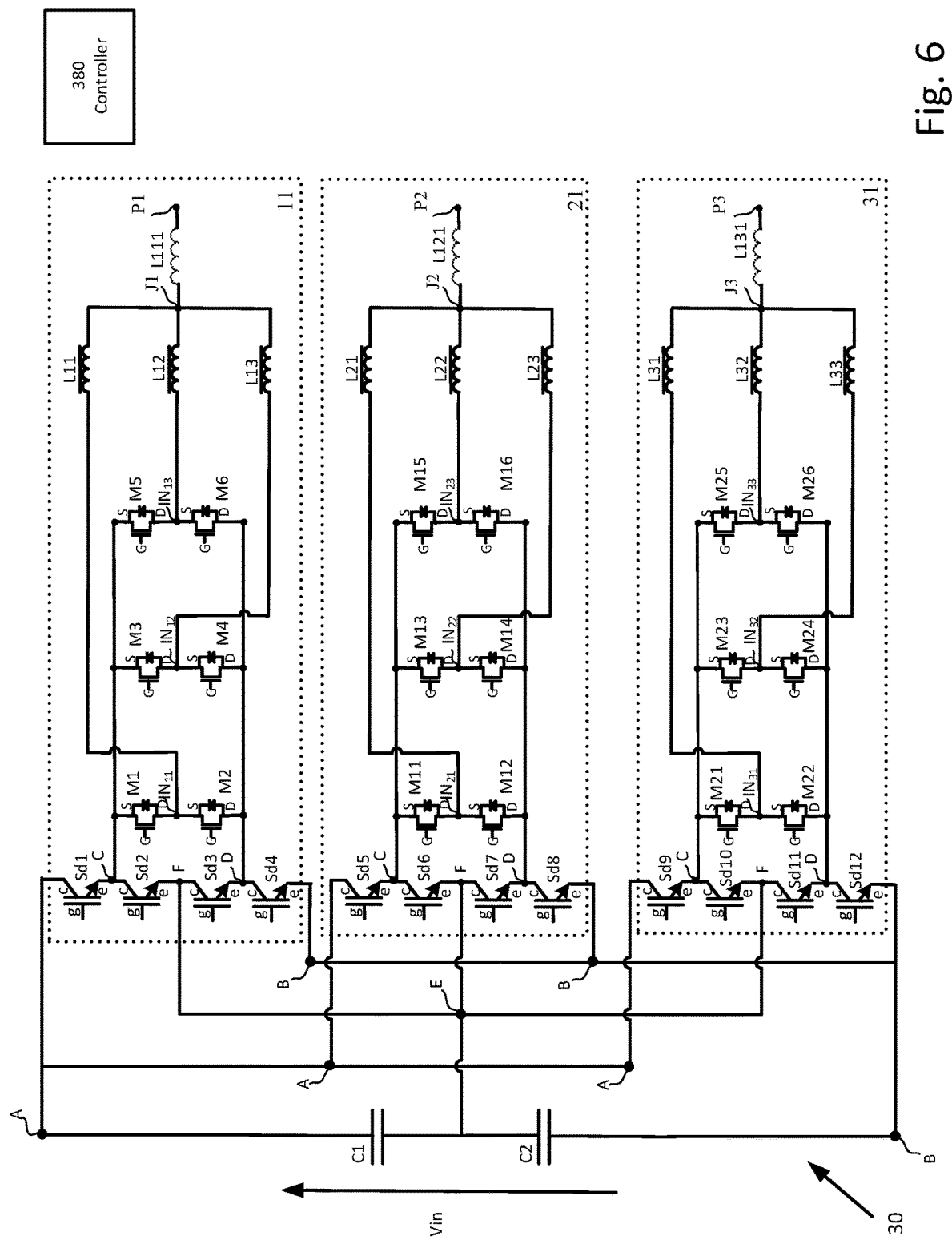
FIG. 6 illustrates a diagram of an electrical circuit according to aspects of the disclosure.

Reference is made to FIG. 6, which illustrates a circuit diagram of a power converter circuit 30 according to illustrative aspects of the disclosure. FIG. 6 provides an example of a multi-level inverter circuit topology. Thus, in the example embodiment of FIG. 6, the power converter circuit 30 is an example of a three-phase multilevel inverter. A direct current (DC) input voltage Vin may be applied across input terminals A and B. Input voltage Vin may be a DC voltage received from a DC power source, e.g. a battery, a photovoltaic panel, a rectified source of alternating current (AC) from an AC generator, etc.

A series connection of capacitors C1 and C2 may be connected across input terminals A and B. In some aspects, capacitors C1 and C2 may be replaced by a plurality of series and/or parallel connected capacitors. Node E may be the point of connection between capacitors C1 and C2 (e.g., intermediate node). Node E may be coupled to neutral and/or earth potential.

In some aspects, power converter circuit 30 may comprise a plurality of single-phase power converter circuits. Thus, in the example embodiment of FIG. 6, the power converter circuit 30 comprises three single-phase converter circuits 11, 21 and 31. In the example embodiment of FIG. 6, each of single-phase converter circuits 11, 21 and 31 are similar to power converter circuit 10 of FIG. 1. Each of the single-phase converter circuits 11, 21 and 31 may be connected across input terminals A and B and configured to receive direct current input voltage $V_{in}$. Each of the single-phase converter circuits 11, 21 and 31 may be connected to node E. Each of the single-phase converter circuits 11, 21 and 31 may be configured to convert direct current input voltage $V_{in}$ to an alternating current.

Power converter circuit 11 may comprise: a series connection of switches Sd1, Sd2, Sd3 and Sd4 (e.g., similar to switches Sa1, Sa2, Sa3 and Sa4 of FIG. 1) that may also be connected across input terminals A and B, and a plurality of series connections of switches M1, M2, M3, M4, M5 and M6 (e.g., similar to switches Sb1, Sb2, Sb3, Sb4, Sb5 and Sb6 of FIG. 1) that may be connected across nodes C and D. In the example embodiment of FIG. 6, switches Sd1, Sd2, Sd3 and Sd4 may be insulated gate bipolar transistors (IGBTs) and switches M1, M2, M3, M4, M5 and M6 may be MOSFETs (e.g., similar to FIG. 2). Each series connection of switches M1, M2, M3, M4, M5 and M6 may comprise an intermediate node; the series connection of switches M1-M2 may comprise intermediate node $IN_{11}$, the series connection of switches M3-M4 may comprise intermediate node $IN_{12}$, and the series connection of switches M5-M6 may comprise intermediate node $IN_{13}$. Within power converter circuit 11, a corresponding first terminal of inductors L11, L12, and L13 may be coupled to node J1 (e.g., an output terminal) and a corresponding second terminal of inductors L11, L12, and L13 may be coupled respectively to terminals $IN_{11}$, $IN_{12}$, and $IN_{13}$. Terminal J1 may combine the voltages of the output legs. In some aspects, terminal J1 may be an output terminal of power converter circuit 11 that may output an AC sine wave (e.g., with DC offset). For example, terminal J1 may be an output terminal of one phase in a single-phase/three-phase/multi-phase converter. Inductors L11, L12, and L13 may be mutually coupled together. Inductors L11, L12, and L13 may be utilized to smooth a sine-wave of an AC output of power converter circuit 11. In some embodiments, inductor L111 (e.g., differential filter) may be coupled/connected between terminal J1 and terminal P1. In such embodiment, terminal P1 may be an output terminal of one phase in a single-phase/three-phase/multi-phase converter. In some aspects, a capacitor may be coupled between terminal J1 and a reference terminal (e.g., node E).

Power converter circuit 21 may comprise: a series connection of switches Sd5, Sd6, Sd7 and Sd8 (e.g., similar to switches Sa1, Sa2, Sa3 and Sa4 of FIG. 1) that may also be connected across input terminals A and B, and a plurality of series connections of switches M11, M12, M13, M14, M15 and M16 (e.g., similar to switches Sb1, Sb2, Sb3, Sb4, Sb5 and Sb6 of FIG. 1) that may be connected across nodes C and D. In the example embodiment of FIG. 6, switches Sd5, Sd6, Sd7 and Sd8 may be insulated gate bipolar transistors (IGBTs) and switches M11, M12, M13, M14, M15 and M16 may be MOSFETs (e.g., similar to FIG. 2). Each series connection of switches M11, M12, M13, M14, M15 and M16 may comprise an intermediate node; the series connection of switches M11-M12 may comprise intermediate node $IN_{21}$, the series connection of switches M13-M14 may comprise intermediate node $IN_{22}$, and the series connection of switches M15-M16 may comprise intermediate node $IN_{23}$. Within power converter circuit 21, a corresponding first terminal of inductors L21, L22, and L23 may be coupled to node J2 (e.g., an output terminal) and a corresponding second terminal of inductors L21, L22, and L23 may be coupled respectively to terminals $IN_{21}$, $IN_{22}$, and $IN_{23}$. Terminal J2 may combine the voltages of the output legs. In some aspects, terminal J2 may be an output terminal of power converter circuit 21 that may output an AC sine wave (e.g., with DC offset). For example, terminal J2 may be an output terminal of one phase in a single-phase/three-phase/multi-phase converter. Inductors L21, L22, and L23 may be mutually coupled together. Inductors L21, L22, and L23 may be utilized to smooth a sine-wave of an AC output of power converter circuit 21. In some embodiments, inductor L121 (e.g., differential filter) may be coupled/connected between terminal J2 and terminal P2. In such embodiment, terminal P2 may be an output terminal of one phase in a single-phase/three-phase/multi-phase converter. In some aspects, a capacitor may be coupled between terminal J2 and a reference terminal (e.g., node E).

Power converter circuit 31 may comprise: a series connection of switches Sd9, Sd10, Sd11 and Sd12 (e.g., similar to switches Sa1, Sa2, Sa3 and Sa4 of FIG. 1) that may also be connected across input terminals A and B, and a plurality of series connections of switches M21, M22, M23, M24, M25 and M26 (e.g., similar to switches Sb1, Sb2, Sb3, Sb4, Sb5 and Sb6 of FIG. 1) that may be connected across nodes C and D. In the example embodiment of FIG. 6, switches Sd9, Sd10, Sd11 and Sd12 may be insulated gate bipolar transistors (IGBTs) and switches M21, M22, M23, M24, M25 and M26 may be MOSFETs (e.g., similar to FIG. 2). Each series connection of switches M21, M22, M23, M24, M25 and M26 may comprise an intermediate node; the series connection of switches M21-M22 may comprise intermediate node $IN_{31}$, the series connection of switches M23-M24 may comprise intermediate node $IN_{32}$, and the series connection of switches M25-M26 may comprise intermediate node $IN_{33}$. Within power converter circuit 31, a corresponding first terminal of inductors L31, L32, and L33 may be coupled to node J3 (e.g., an output terminal) and a corresponding second terminal of inductors L31, L32, and L33 may be coupled respectively to terminals $IN_{31}$, $IN_{32}$, and $IN_{33}$. Terminal J3 may combine the voltages of the output legs. In some aspects, terminal J3 may be an output terminal of power converter circuit 31 that may output an AC sine wave (e.g., with DC offset). For example, terminal J3 may be an output terminal of one phase in a single-phase/three-phase/multi-phase converter. Inductors L31, L32, and L33 may be mutually coupled together. Inductors L31, L32, and L33 may be utilized to smooth a sine-wave of an AC output of power converter circuit 31. In some embodiments, inductor L131 (e.g., differential filter) may be coupled/connected between terminal J3 and terminal P3. In such embodiment, terminal P3 may be an output terminal of one phase in a single-phase/three-phase/multi-phase converter. In some aspects, a capacitor may be coupled between terminal J3 and a reference terminal (e.g., node E).

Controller 380 may be: a digital signal processing (DSP) circuit, a field programmable gate array (FPGA) device, etc. Controller 380 may control power converter circuit 30 and its components (for example, switches, voltages, etc.) based on a predetermined algorithm, a measured parameter (e.g., a measurement collected by one or more sensors), a calculated parameter, determined or estimated (e.g., based on one or more measured parameters) parameter, any other appropriate data, etc. As an example, the electrical parameter may be: current, voltage, power, frequency, etc. In some aspects, controller 380 may comprise sensors to measure or sense one or more electrical parameters.

Controller 380 may control switches Sd1, Sd2, Sd3, Sd4, Sd5, Sd6, Sd7, Sd8, Sd9, Sd10, Sd11, Sd12, M1, M2, M3, M4, M5, M6, M11, M12, M13, M14, M15, M16, M21, M22, M23, M24, M25 and M26. The switches M1, M2, M3, M4, M5, M6, M11, M12, M13, M14, M15, M16, M21, M22, M23, M24, M25 and M26 may be insulated gate bipolar transistors (IGBTs), metal oxide semiconductor field effect transistors (MOSFETs), bipolar junction transistors (BJTs), filed effect transistors (FETs), as silicone-controlled rectifiers (SCRs) or any known solid-state switch, or any combination of these components.

Switches Sd1, Sd2, Sd3, Sd4, Sd5, Sd6, Sd7, Sd8, Sd9, Sd10, Sd11, and Sd12 may be switched at a first frequency. The first frequency may be the output frequency (e.g., grid frequency, load frequency, utility frequency, (power) line frequency, 50 Hz-60 Hz, etc.). Each switch in each pair of switches Sd1+Sd3, Sd2+Sd4, Sd5+Sd7, Sd6+Sd8, Sd9+Sd11, Sd10+Sd12, may be closed/turned ON/conducting substantially at the same time, and may be open/turned OFF/non-conducting substantially at the same time. Each pair of the pairs of switches Sd1+Sd3, Sd5+Sd7, and Sd9+

Sd11 may be switched at the same time and in a complementary manner with regard to the pairs of switches Sd2+Sd4, Sd6+Sd8, and Sd10+Sd12 respectively (e.g., when pair of switches Sd1+Sd3 are closed, the pair of switches Sd2+Sd4 may be open).

The pairs of switches Sd1+Sd3 and Sd2+Sd4 may be switched in a 120° phase (of the first frequency) with respect to pairs of switches Sd5+Sd7 and Sd6+Sd8, and may be switched in a 240° phase (of the first frequency) with respect to pairs of switches Sd9+Sd11 and Sd10+Sd12.

Switches M1, M2, M3, M4, M5, M6, M11, M12, M13, M14, M15, M16, M21, M22, M23, M24, M25 and M26 may be switched at a second frequency. The second frequency may be higher than the first frequency. Each switch of switches M1, M3, M5, M11, M13, M15, M21, M23, and M25 may be switched in a complementary manner with regard to switch M2, M4, M6, M12, M14, M16, M22, M24, and M26 respectively. For example, switch M1 may be closed/turned ON/conducting when switch M2 is open/turned OFF/non-conducting, and switch M1 may be open/turned OFF/non-conducting when switch M2 is closed/turned ON/conducting.

For generalization, in a power converter circuit comprising a plurality of N series connections of two or more switches, each group (e.g., pair) of series-connected switches (e.g., where M1-M2 is the first pair, M3-M4 is the second pair, M5-M6 is the third pair . . . and $M_{(2N-1)}$-$M_{2N}$ is the $n^{th}$ pair) is shifted sequentially by 1/N (where N is the number of series connections) of the switching period of the second frequency with respect to the other groups (e.g., pairs) of series-connected switches. For example, power converter circuits 11, 21 and 31 comprise three (N=3) series connections of switches, thus each series connection of switches may be switched with phase-shift of 120°.

In some aspects, each group (e.g., pair) of the groups (e.g., pairs) of series-connected switches of all power converter circuits may be shifted sequentially by 1/(P*N) (where P is the number of parallel connected power converters) of the switching period of the second frequency with respect to the other groups (e.g., pairs) of series-connected switches.

For example, in FIG. 6 where P=N=3, the switches M1, M2, M3, M4, M5, M6, M11, M12, M13, M14, M15, M16, M21, M22, M23, M24, M25 and M26 may be switched according to following sequential phase-shifting of the second frequency (e.g., higher-frequency):

| | Pair of switches | | | | | | | | |
|---|---|---|---|---|---|---|---|---|---|
| | M1-M2 | M3-M4 | M5-M6 | M11-M12 | M13-M14 | M15-M16 | M21-M22 | M23-M24 | M25-M26 |
| Phase-shift | 0° | 120° | 240° | 40° | 160° | 280° | 80° | 200° | 320° |

The phase shifting between each pair of the pairs of series-connected switches of all single-phase power converter circuits (e.g., single-phase converter circuits 11, 21, and 31) may enable a power converter (e.g., power converter circuit 30) to achieve lower ripple input current and lower voltage fluctuations over the input capacitance (e.g., capacitors C1 and C2 of FIGS. 1, 2 and 6).

In some aspects, the sequential phase shifting at the second frequency of the switches may reduce the temporary and mean (e.g., average) input current drawn by the power converter circuit (for example, power converter circuit 30) according to illustrative aspects of the disclosure. Thus, the ripple voltage across the bulk/input capacitors (e.g., capacitors C1 and C2) may be reduced. The reduction of ripple voltage and/or current flowing through the bulk/input capacitors may reduce the cost and size of a power converter circuit.

Switches M1, M2, M3, M4, M5, M6, M11, M12, M13, M14, M15, M16, M21, M22, M23, M24, M25 and M26 may be switched according to the duty cycle ratio, which may be changed according to a comparison between a reference voltage and the output voltage at output terminals P1, P2 and P3. In some aspects, the reference voltage of the switches of series connection of switches (e.g., Sd1, Sd2, Sd3, and Sd4) may be similar to the reference voltage of the switches of the same power converter circuit (e.g., switches M1, M2, M3, M4, M5, and M6). An example for the timing shown in FIGS. 3-4 may be an example of the desired duty cycles, but a variety of different timings may be used that may have similar or different switching performance.

Figure 7:
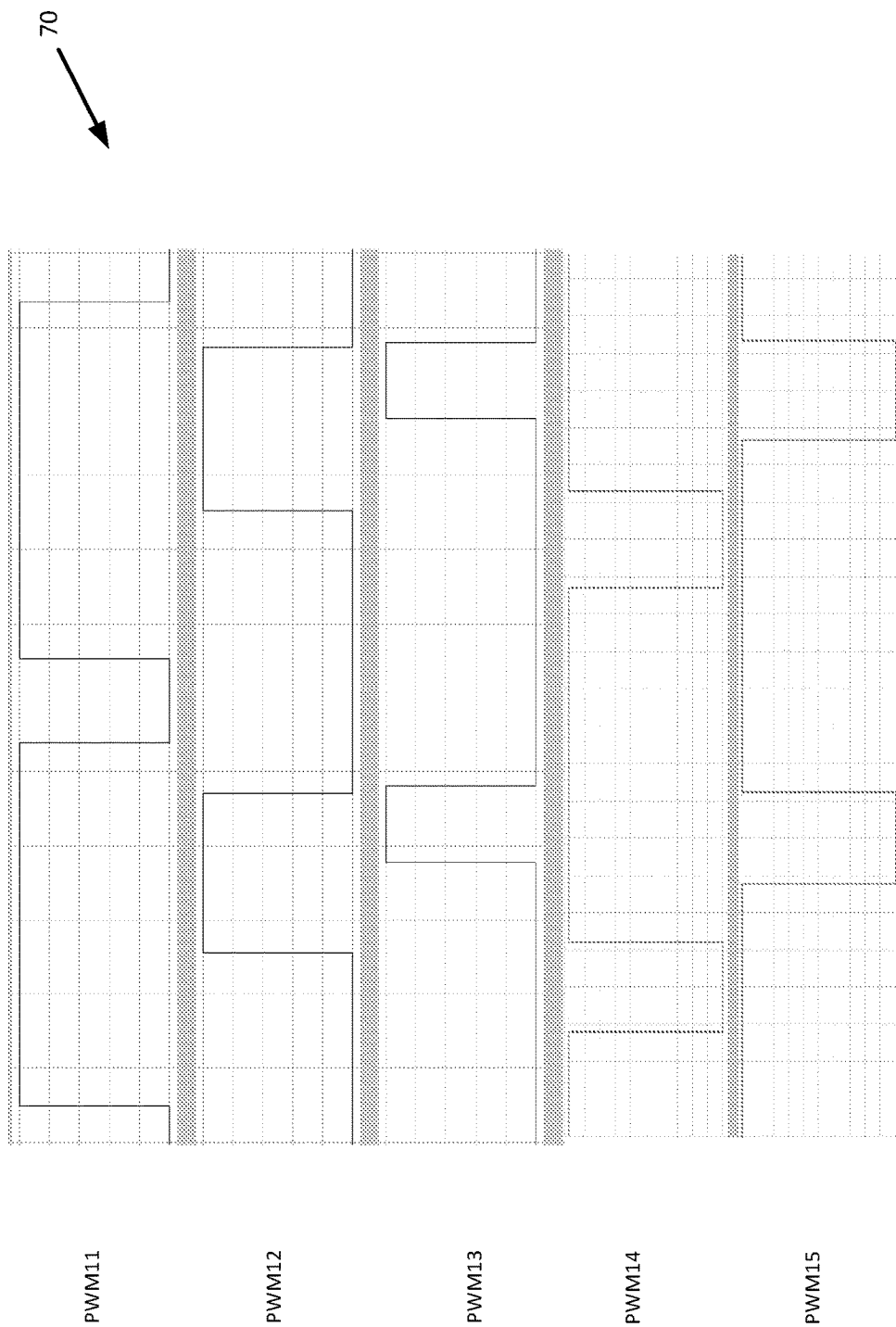
FIG. 7 illustrates a timing diagram of an electrical circuit according to aspects of the disclosure.

Reference is made to FIG. 7, which illustrates timelines 70 showing waveforms that describe, according to some aspects of the disclosure, a possible control method of a power converter circuit (e.g., power converter circuit 30 comprising three single-phase converter circuits 11, 21 and 31). The timelines show waveforms, in volts (V) versus time, and illustrate an example for possible control signals. A different graph is provided for each of the control signals PWM11, PWM12, PWM13, PWM14 and PWM15 used to control switches of the power converter circuit. The PWM11, PWM12, PWM13, PWM14 and PWM15 control signals may be generated by digital encoding component(s) (e.g., a microprocessor, general processor, etc.) and/or analog circuit(s) (e.g., using a comparator, oscillator, etc.). For example, PWM11, PWM12, PWM13, PWM14 and PWM15 control signals may be generated by controller 380 of FIG. 6.

In the example shown in FIG. 7, control signals PWM11, PWM12, PWM13, PWM14 and PWM15 may be generated at the second frequency of FIG. 6, which is relatively higher than the first frequency, the switching frequency of the switches of the series connection of switches (e.g., switches Sd1, Sd2, Sd3 and Sd4 of FIG. 6), and the frequency of the output voltage at output terminals P1, P2 and P3, e.g., 50 Hz. Control signals PWM11, PWM12, PWM13, PWM14 and PWM15 may be varied according to the duty cycle ratio, which may be changed according to a comparison between a reference voltage and the output voltage at output terminals P1, P2 and P3.

Control signals PWM11, PWM14 and PWM15 may control switches of different series connections in a power converter, where all series connections may be connected in parallel with respect to each other. For example, control signals PWM11, PWM14 and PWM15 may control the gate terminal (G) of MOSFETs M1, M3 and M5 of power converter circuit 11 in FIG. 6, respectively (or M11, M13 and M15 of power converter circuit 21 in FIG. 6, respectively, or M21, M23 and M25 of power converter circuit 31 in FIG. 6, respectively). For instance, control signals PWM11, PWM14 and PWM15 may be similar to control signals PWM3, PWM4 and PWM5 of FIG. 3.

Control signals PWM11, PWM14 and PWM15 may be shifted sequentially by 1/(P) (where P is the number of parallel connected single-phase power converters) of the switching period of the second frequency with respect to each other. For example, in FIG. 6, where P=3, control signals PWM11, PWM14 and PWM15 may be shifted sequentially by 120°.

Control signals PWM11, PWM14 and PWM15 may be varied according to a common duty cycle ratio, which may be changed according to a comparison between a common reference voltage and the output voltage at the output terminal of the single-phase power converter (e.g., terminal P1 of single-phase power converter 11).

In some aspects, controller 380 of FIG. 6 may generate complementary PWM control signals with respect to PWM control signals PWM11, PWM14 and PWM15. The complementary PWM control signals may control the corresponding and complementary switch(es) to the series connection. For example, complementary PWM control signals with respect to PWM control signals PWM11, PWM14 and PWM15 may control the gate terminal (G) of MOSFETs M2, M4 and M6 of FIG. 6, respectively.

Control signals PWM11, PWM12 and PWM13 may control each of the switches of different parallel-connected power converters. Following the above example, where control signal PWM11 controls the gate terminal (G) of MOSFET M1 of power converter circuit 11 in FIG. 6, control signals PWM12 and PWM13 may control the gate terminal (G) of MOSFETs M11 and M21 of power converters 21 and 31 in FIG. 6, respectively.

Control signals PWM11, PWM12 and PWM13 may be shifted sequentially by 1/(P*N) (where P is the number of parallel connected power converters, and N is the number of parallel series connections in each power converter) of the switching period of the second frequency with respect to each other. For example, in FIG. 6, where P=N=3, control signals PWM11, PWM12 and PWM13 may be shifted sequentially by 40°.

Control signals PWM11, PWM12 and PWM13 may be varied according to a different duty cycle ratio, which may be changed according to a comparison between a common reference voltage and the output voltage at the output terminal of the corresponding single-phase power converter. For example, the duty cycle ratio of control signal PWM11 may be changed according to a comparison between a common reference voltage and the output voltage at terminal P1 of single-phase power converter 11. The duty cycle ratio of control signal PWM12 and PWM13 may be changed according to a comparison between a common reference voltage and the output voltage at terminal P2 of single-phase power converter 21 and P3 of single-phase power converter 31, respectively. The output voltages at each of terminals P1, P2 and P3 may be phase shifted by 120°, thus, the duty-cycle of each of control signals PWM11, PWM12 and PWM13 may vary.

Figure 8:
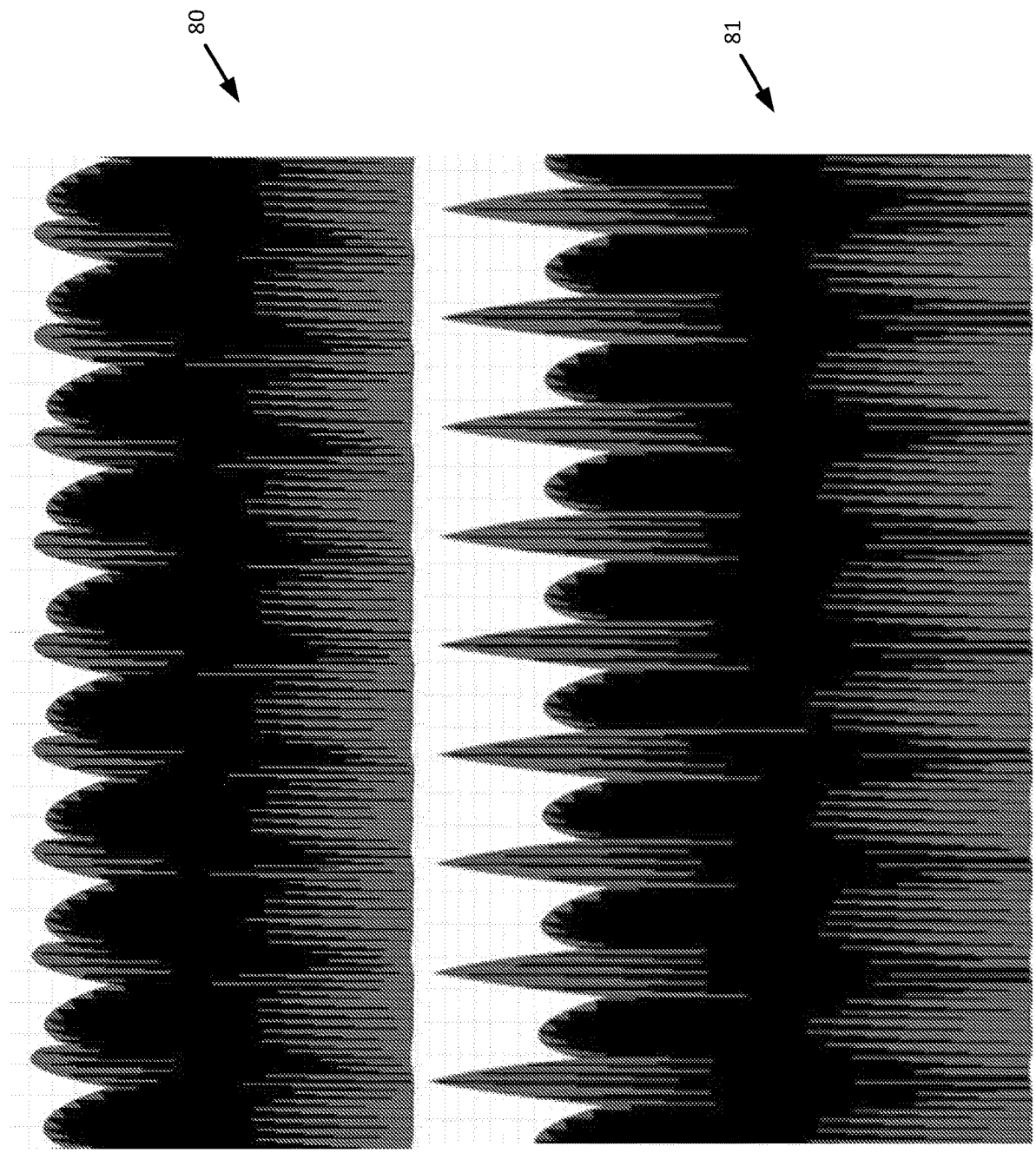
FIG. 8 illustrates waveforms associated with electrical circuits according to aspects of the disclosure.

Reference is made to FIG. 8, which illustrates timelines 80 and 81 showing waveforms that describe, according to some aspects of the disclosure, a current flowing through the bulk/input capacitors of a power converter circuit (e.g., capacitors C1 and C2 of FIGS. 1, 2 and 6). The timelines show waveforms, in current (A) versus time.

Timeline 80 illustrates a current flowing through the bulk/input capacitors of a 3-phase power converter circuit using sequential phase shifting (for example, as depicted referring to FIGS. 6 and 7) with respect to each of the switches (within each phase and between each phase).

Timeline 81 illustrates a current flowing through the bulk/input capacitors of a 3-phase power converter circuit with the same configuration of elements as the power converter circuit of timeline 80. However, the current shown in timeline 81 illustrates an operation without the sequential phase-shifting at the high-frequency (e.g., second frequency of FIGS. 1, 2, 3, 4 and 6) between different single-phase power converters; although a high-frequency phase-shift between different series connections within a single-phase power converter may exist, for example, as shown in FIG. 3.

It can be noted, based on the comparison between the currents illustrated in timelines 80 and 81, that the sequential phase shifting may achieve lower ripple input current, and, thus, lower voltage fluctuations over the input capacitance (e.g., capacitors C1 and C2 of FIGS. 1, 2 and 6).

In some aspects, the sequential phase shifting of the switches may reduce the temporary and mean (e.g., average) input current drawn by the power converter circuit (for example, power converter circuit 30) according to illustrative aspects of the disclosure. The reduction of ripple voltage and/or current flowing through the bulk/input capacitors may reduce cost and size.

Figure 9:
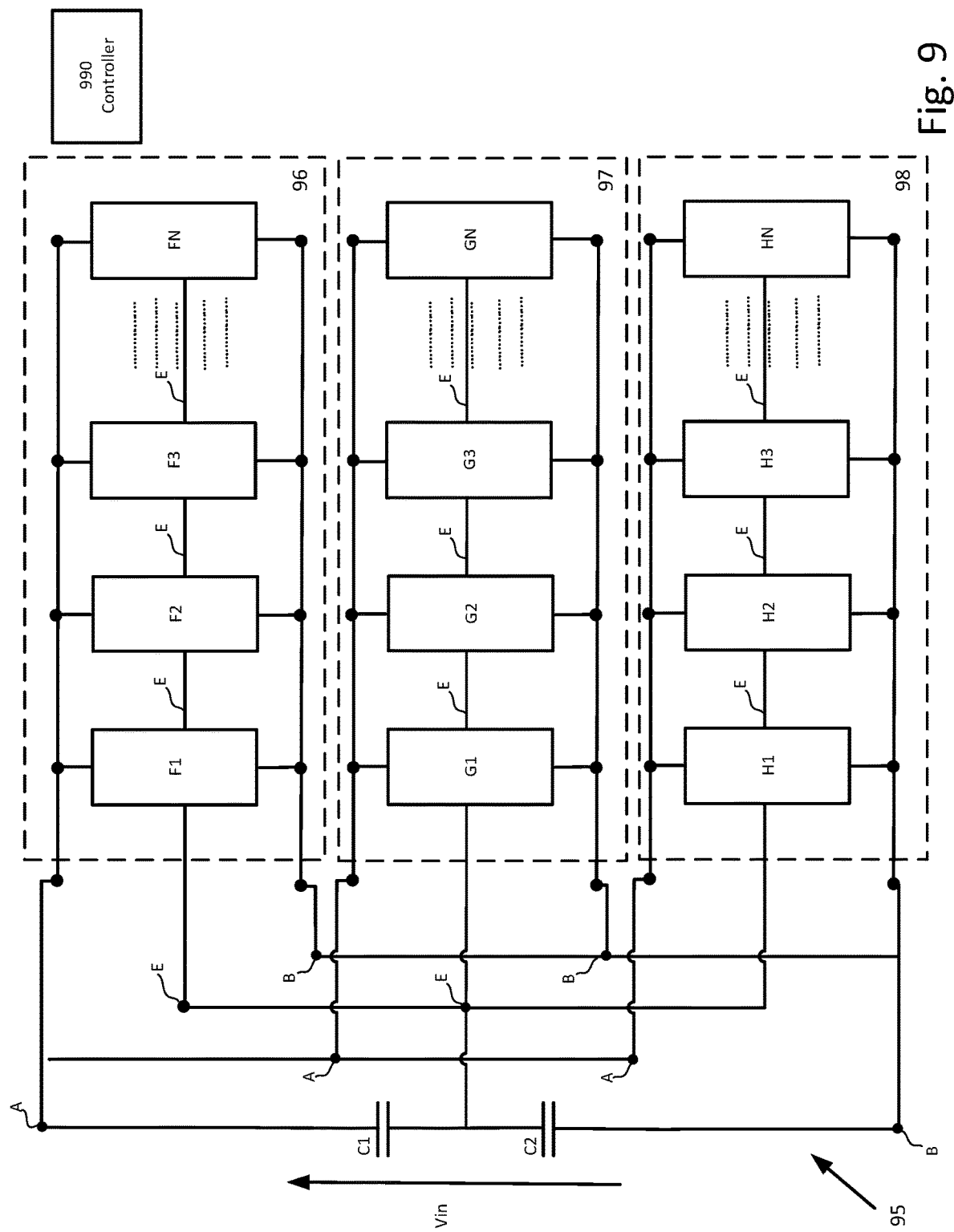
FIG. 9 illustrates a diagram of an electrical circuit according to aspects of the disclosure.

Reference is made to FIG. 9, which illustrates a circuit diagram of a power converter circuit 95 according to illustrative aspects of the disclosure. FIG. 9 provides a generalization of an (e.g., multi-level) inverter circuit topology according to illustrative aspects of the disclosure. In the example embodiment of FIG. 9, the power converter circuit 95 is an example of a three-phase multilevel inverter. A direct current (DC) input voltage Vin may be applied across input terminals A and B. Input voltage Vin may be a DC voltage received from a DC power source, e.g. a battery, a photovoltaic panel, a rectified source of alternating current (AC) from an AC generator, etc.

A series connection of capacitors C1 and C2 may be connected across input terminals A and B. In some aspects, capacitors C1 and C2 may be replaced by a plurality of series and/or parallel connected capacitors. Node E may be the point of connection between capacitors C1 and C2 (e.g., intermediate node). Node E may be coupled to neutral and/or earth potential.

In some aspects, power converter circuit 95 may comprise a plurality of single-phase power converter circuits. In the example embodiment of FIG. 9, the power converter circuit 95 comprises three single-phase converter circuits 96, 97 and 98. Each of the single-phase converter circuits 96, 97 and 98 may be connected across input terminals A and B and configured to receive direct current input voltage $V_{in}$. Each of the single-phase converter circuits 96, 97 and 98 may be connected to node E. Each of the single-phase converter circuits 96, 97 and 98 may be configured to convert direct current input voltage $V_{in}$ to an alternating current at a first frequency.

In the example embodiment of FIG. 9, each of single-phase converter circuits 96, 97 and 98 may comprise a plurality of switches (e.g., switches Sa1-Sa4 and Sb1-Sb$_{2N}$ of power converter circuit 10 of FIG. 1). The plurality of switches may be coupled in different configurations, for example according to the following topologies: neutral-point clamped (NPC), T-type neutral-point clamped (TNPC), active neutral-point clamped (ANPC), half-bridge (HB), flying-capacitor (FC), etc. The switches may be insulated gate bipolar transistors (IGBTs), metal oxide semiconductor field effect transistors (MOSFETs), bipolar junction transistors (BJTs), field effect transistors (FETs), silicone-controlled rectifiers (SCRs) or any known solid-state switch, or any combination of these components.

Controller 990 may be: a digital signal processing (DSP) circuit, a field programmable gate array (FPGA) device, etc. Controller 990 may control power converter circuits 96, 97 and 98 and their components (for example, switches, voltages, etc.) based on a predetermined algorithm, a measured parameter (e.g., a measurement collected by one or more sensors), a calculated parameter, a determined or estimated (e.g., based on one or more measured parameters) parameter, any other appropriate data, etc. As an example, the electrical parameter may be: current, voltage, power, frequency, etc. In some aspects, controller 990 may comprise sensors to measure or sense one or more electrical parameters.

Power converter circuits 96, 97 and 98 may comprise an inductor or a plurality of inductors coupled to an output terminal. In some aspects, power converter circuits 96, 97 and 98 may output at a corresponding output terminal an AC sine wave (e.g., with DC offset). The inductor may be utilized to smooth a sine-wave of an AC output of a corresponding power converter circuit. In case of a plurality of inductors, the inductors may be mutually coupled together.

Power converter circuit 96 may comprise a plurality of circuits comprising N circuits: F1, F2, F3 . . . and FN. The plurality of circuits F1, F2, F3 . . . and FN may be connected across input terminals A and B and configured to receive direct current input voltage $V_{in}$. Each of the plurality of circuits F1, F2, F3 . . . and FN may be connected to node E.

Power converter circuit 97 may comprise a plurality of circuits comprising N circuits: G1, G2, G3 . . . and GN. The plurality of circuits G1, G2, G3 . . . and GN may be connected across input terminals A and B and configured to receive direct current input voltage $V_{in}$. Each of the plurality of circuits G1, G2, G3 . . . and GN may be connected to node E.

Power converter circuit 98 may comprise a plurality of circuits comprising N circuits: H1, H2, H3 . . . and HN. The plurality of circuits H1, H2, H3 . . . and HN may be connected across input terminals A and B and configured to receive direct current input voltage $V_{in}$. Each of the plurality of circuits H1, H2, H3 . . . and HN may be connected to node E.

Each circuit of the plurality of circuits F1, F2, F3 . . . and FN, circuits G1, G2, G3 . . . and GN, H1, H2, H3 . . . and HN may comprise a similar configuration of elements (e.g., switches, capacitors, inductors, etc.). The configuration of elements may be according to one or more of the following topologies: neutral-point clamped (NPC), T-type neutral-point clamped (TNPC), active neutral-point clamped (ANPC), half-bridge (HB), flying-capacitor (FC), etc. Controller 990 may control the plurality of circuits F1, F2, F3 . . . and FN, circuits G1, G2, G3 . . . and GN, H1, H2, H3 . . . and HN at a second frequency corresponding to the selected configuration. In some aspects, the second frequency may be similar to the first frequency.

Each circuit of the plurality of circuits of each power converter circuit (for example each circuit of the plurality of circuits F1, F2, F3 . . . and FN) may be shifted sequentially by 1/N (where N is the number parallel-connected circuit) of the switching period (of the second frequency) with respect to the other circuits of the plurality of circuits.

The output voltage of power converter circuit 96 may be in a 120° phase with respect to the output voltage of power converter circuit 97, and in a 240° phase (of the first frequency) with respect to output voltage of power converter circuit 98.

For generalization, in an inverter circuit comprising P parallel connected power converters (e.g., power converters 96, 97 and 98) generating a sine-wave at a first frequency, where each power converter of the power converters comprises N circuits (e.g. F1, F2, F3 . . . and FN) controlled at a second frequency, each circuit (e.g. F1, F2, F3 . . . and FN) may be shifted sequentially by 1/(P*N) of the switching period of the second frequency with respect to the other circuits of power converters (e.g. circuits G1, G2, G3 . . . and GN, H1, H2, H3 . . . and HN).

For example, power converter circuit (e.g., inverter) 95 comprises three power converter circuits 96, 97 and 98, and thus P=3. Each of the three power converter circuits 96, 97 and 98 comprises four (N=4) series connections of switches, thus controller 990 may control each circuit with phase-shift of 30°, according to following control scheme using a sequential phase-shifting (of the second frequency):

| Circuits | F1 | F2 | F3 | F4 | G1 | G2 | G3 | G4 | H1 | H2 | H3 | H4 |
|---|---|---|---|---|---|---|---|---|---|---|---|---|
| Phase-shift | 0° | 90° | 180° | 270° | 30° | 120° | 210° | 300° | 60° | 150° | 240° | 330° |

The phase shifting between each circuit of all power converter circuits may enable the power converter circuit 95 to achieve lower ripple input current and lower voltage fluctuations over the input capacitance (e.g., capacitors C1 and C2 of FIGS. 1, 2, 6 and 9).

In some aspects, the sequential phase shifting of the switches may reduce the temporary and mean (e.g., average) input current drawn by the power converter circuit (for example, power converter circuit 95) according to illustrative aspects of the disclosure. Thus, the ripple voltage across the bulk/input capacitors (e.g., capacitors C1 and C2) may be reduced. The reduction of ripple voltage and/or current flowing through the bulk/input capacitors may reduce cost and size.

Figure 10:
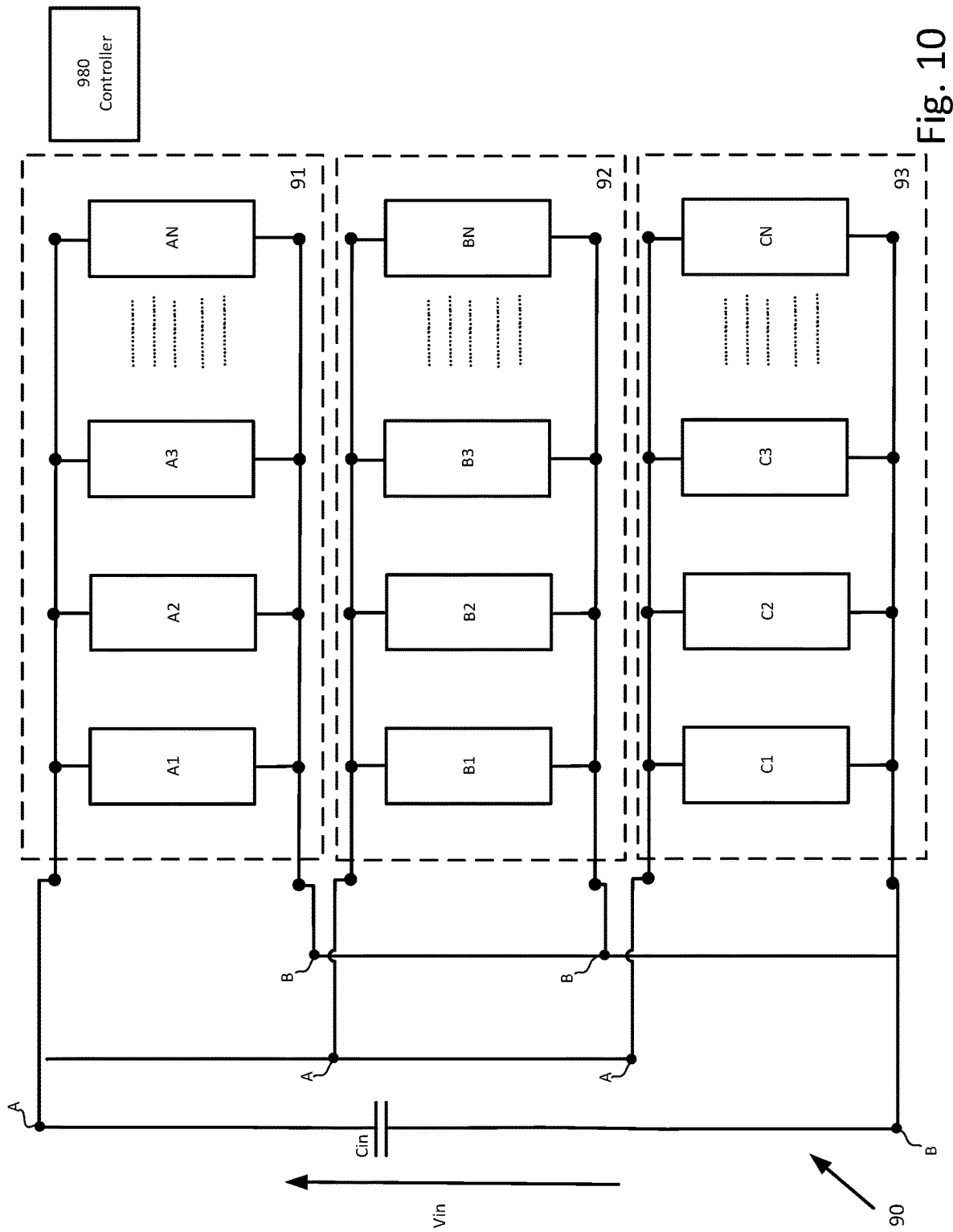
FIG. 10 illustrates a diagram of an electrical circuit according to aspects of the disclosure.

Reference is made to FIG. 10, which illustrates a circuit diagram of a power converter circuit 90 according to illustrative aspects of the disclosure. FIG. 10 provides a generalization of an (e.g., multi-level) inverter circuit topology according to illustrative aspects of the disclosure. FIG. 10 may be an example of circuit 95 of FIG. 9, according to aspects of the disclosure. As shown in FIG. 10, in some aspects of the disclosure, the circuits of each power converter circuit might not be coupled to the middle point of connection between capacitors C1 and C2 (e.g., intermediate node). Thus, in FIG. 10, the input capacitance is shown by a single capacitor Cin, which may comprise a capacitor or a plurality of capacitors.

In some aspects, power converter circuit 90 may comprise a plurality of single-phase power converter circuits. In the example embodiment of FIG. 9, the power converter circuit 90 comprises three single-phase converter circuits 96, 97 and 98. Each of the single-phase converter circuits 91, 92 and 93 may be connected across input terminals A and B and configured to receive direct current input voltage $V_{in}$. Each of the single-phase converter circuits 91, 92 and 93 may be configured to convert direct current input voltage $V_{in}$ to an alternating current at a first frequency.

In the example embodiment of FIG. 10, each of single-phase converter circuits 91, 92 and 93 may comprise a plurality of switches (e.g., switches Sa1-Sa4 and Sb1-Sb$_{2N}$ of power converter circuit 10 of FIG. 1). The plurality of switches may be coupled in different configurations, for example according to the following topologies: neutral-point clamped (NPC), T-type neutral-point clamped (TNPC), active neutral-point clamped (ANPC), half-bridge (HB), flying-capacitor (FC), etc. The switches may be insulated gate bipolar transistors (IGBTs), metal oxide semiconductor field effect transistors (MOSFETs), bipolar junction transistors (BJTs), field effect transistors (FETs), silicone-controlled rectifiers (SCRs) or any known solid-state switch, or any combination of these components.

Power converter circuit 91 may comprise a plurality of circuits comprising N circuits: A1, A2, A3 . . . and AN. The plurality of circuits A1, A2, A3 . . . and AN may be connected across input terminals A and B and configured to receive direct current input voltage $V_{in}$.

Power converter circuit 92 may comprise a plurality of circuits comprising N circuits: B1, B2, B3 . . . and BN. The plurality of circuits B1, B2, B3 . . . and BN may be connected across input terminals A and B and configured to receive direct current input voltage $V_{in}$.

Power converter circuit 93 may comprise a plurality of circuits comprising N circuits: C1, C2, C3 . . . and CN. The plurality of circuits C1, C2, C3 . . . and CN may be connected across input terminals A and B and configured to receive direct current input voltage $V_{in}$.

Controller 980 may be: a digital signal processing (DSP) circuit, a field programmable gate array (FPGA) device, etc. Controller 980 may control power converter circuits 91, 92 and 93 and their components (for example, switches, voltages, etc.) based on a predetermined algorithm, a measured parameter (e.g., a measurement collected by one or more sensors), a calculated parameter, a determined or estimated (e.g., based on one or more measured parameters) parameter, any other appropriate data, etc. As an example, the electrical parameter may be: current, voltage, power, frequency, etc. In some aspects, controller 980 may comprise sensors to measure or sense one or more electrical parameters (e.g., current, voltage, resistance).

Controller 980 may control each circuit of the power converters (e.g. circuits A1, A2, A3 . . . and AN, B1, B2, B3 . . . and BN, B1, B2, B3 . . . and BN) according the control scheme depicted in reference to FIG. 9 and controller 990.

For generalization, in an inverter circuit comprising P parallel connected power converters (e.g., power converters 91, 92 and 93) generating a sine-wave at a first frequency, where each power converter of the power converters comprises N circuits (e.g. A1, A2, A3 . . . and AN) controlled at a second frequency, each circuit (e.g. A1, A2, A3 . . . and AN) may be shifted sequentially by 1/(P*N) of the switching period of the second frequency with respect to the other circuits of power converters (e.g. circuits B1, B2, B3 . . . and BN, C1, C2, C3 . . . and CN).

For example, inverter 90 comprises three power converter circuits 91, 92 and 93, thus P=3. Each of the three power converter circuits 91, 92 and 93 comprises four (N=4) series connections of switches, thus controller 980 may control each circuit with phase-shift of 30°, according to following control scheme using a sequential phase-shifting (of the second frequency):

B3 . . . and BN, and C1, C2, C3 . . . and CN of FIG. 10, according to aspects of the disclosure. In some aspects, circuit 111 may be a flying-capacitor converter or ANPC with flying-capacitors.

Circuit 110 includes electrical circuit (e.g., power converter) 111 and output inductor L1. Circuit 111 includes: a first plurality of switches Sw1, Sw2, Sw3 and Sw4, a second plurality of switches S1, S2, S3, S4 . . . $S_{2N-1}$, $S_{2N}$, $S_{2N+1}$ and $S_{2N+2}$, and a plurality of capacitors C100, C101, C102 . . . and C10N.

Electrical circuit 111 may be connected across input terminals A and B. (e.g., similar to input terminals A and B of FIG. 10). Electrical circuit 111 may convert the input direct-current (e.g., DC) voltage across input terminals A and B to an output alternating-current (e.g., AC) voltage at terminal OUT. Output inductor L110 may be connected to terminal OUT.

The first plurality of switches may be connected across input terminals A and B. A first terminal of switch Sw1 may be coupled to input terminal A and a second terminal of switch Sw1 may be coupled to node C. A first terminal of switch Sw2 may be coupled to node C and a second terminal of switch Sw2 may be coupled to node F. A first terminal of switch Sw3 may be coupled to node F and a second terminal of switch Sw3 may be coupled to node D. A first terminal of switch Sw4 may be coupled to node D and a second terminal of switch Sw4 may be coupled to input terminal B.

The second plurality of switches S1, S2, S3, S4 . . . $S_{2N-1}$, $S_{2N}$, $S_{2N+1}$ and $S_{2N+2}$ may comprise pairs of switches S1-S2, S3-S4 . . . $S_{2N-1}$-$S_{2N}$, and $S_{2N+1}$-$S_{2N+2}$. Capacitor C100 (or a plurality of capacitors) may be coupled to node C and node D, and between pairs of switches S1-S2. Another capacitor (or a plurality of capacitors) may be connected between two pairs of switches. For example, capacitor C101 may be connected between pairs of switches S1-S2 and S3-S4, capacitor C102 may be connected between pairs of switches S5-S6 (not shown), and capacitor C10N may be connected between pairs of switches $S_{2N-1}$-$S_{2N}$, and $S_{2N+1}$-$S_{2N+2}$. Terminal OUT may be connected between pair of switches $S_{2N+1}$-$S_{2N+2}$.

The first plurality of switches may be switched by a controller (e.g., controller 980 of FIG. 10) at a first frequency. The first frequency may be the output frequency of the voltage at terminal OUT. Switch Sw1 may be switched and conduct simultaneously (e.g., at the same time) with switch Sw3 during the positive half-cycle of the output voltage at terminal OUT. Switch Sw2 may be switched and conduct simultaneously (e.g., at the same time) with switch Sw4 during the negative half-cycle of the output voltage at terminal OUT.

The second plurality of switches may be switched by a controller (e.g., controller 980 of FIG. 10) at a second frequency and according to a duty-cycle ratio of the output voltage at terminal OUT. The second frequency may be higher than the first frequency. Each two switches of the same pair of switches, may be switched (e.g., turned

| Circuits | A1 | A2 | A3 | A4 | B1 | B2 | B3 | B4 | C1 | C2 | C3 | C4 |
|---|---|---|---|---|---|---|---|---|---|---|---|---|
| Phase-shift | 0° | 90° | 180° | 270° | 30° | 120° | 210° | 300° | 60° | 150° | 240° | 330° |

Figure 11:
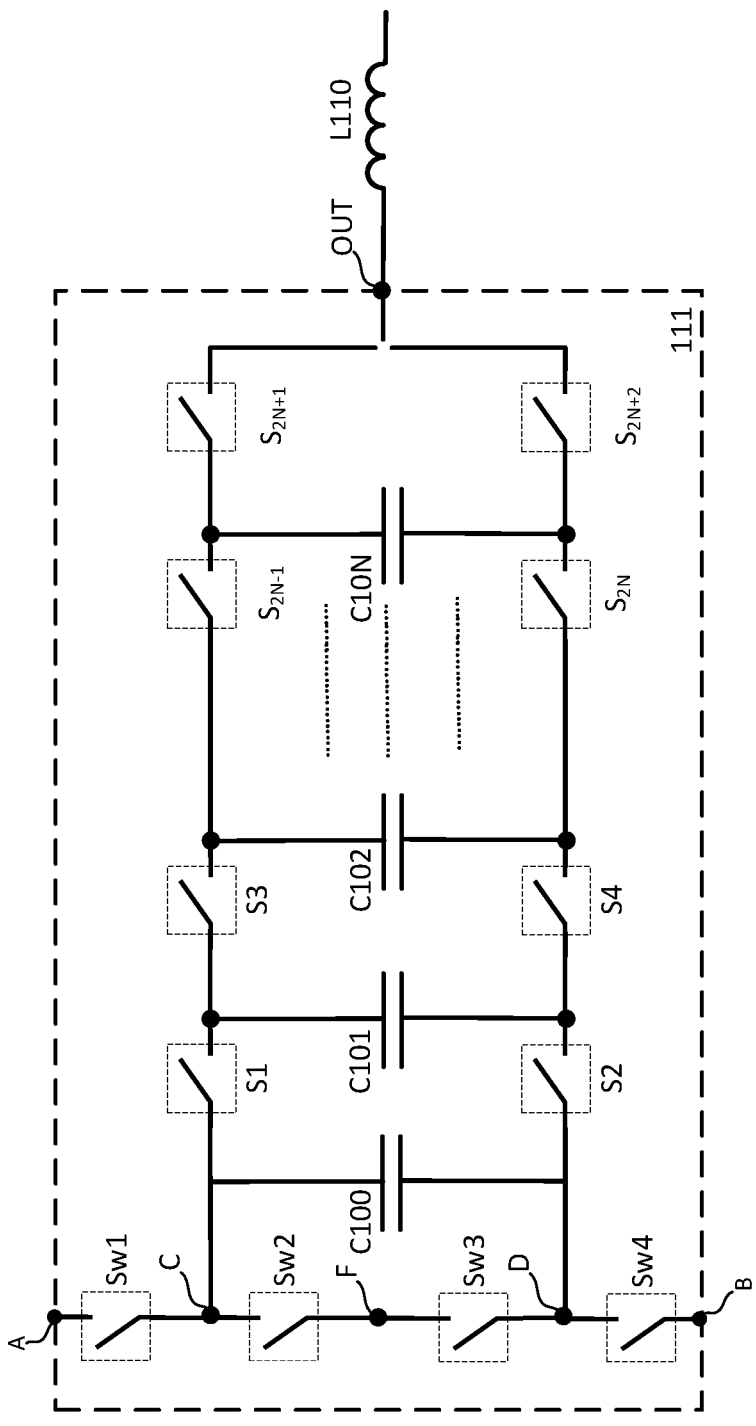
FIG. 11 illustrates a diagram of an electrical circuit according to aspects of the disclosure.

Reference is made to FIG. 11, which illustrates a circuit diagram of an electrical circuit (e.g., power converter) 110. Electrical circuit 110 comprises circuit 111, which may be an example of each of circuits A1, A2, A3 . . . and AN, B1, B2,

ON/conduct) in a complementary manner. For example, during the positive half-cycle of the output voltage at terminal OUT, switch S1 may be switched at a duty-cycle ratio D of the output voltage at terminal OUT, while switch S3 may be switched at 1-D. When switch S1 is OFF, switch S3 may be ON, and vice versa. During the negative half-cycle of the output voltage at terminal OUT, switch S3 may be switched at the duty-cycle ratio D of the output voltage at terminal OUT, while switch S1 may be switched at 1-D.

In some aspects of the disclosure, each pair of switches of the second plurality of switches may be shifted sequentially by 1/N (where N is the number of pair of switches of the second plurality) of the switching period of the second frequency.

In a case where circuit 111 is used for each of circuits A1, A2, A3 . . . and AN, B1, B2, B3 . . . and BN, and C1, C2, C3 . . . and CN of FIG. 10, all output terminals OUT of each circuit of the same power converter (e.g., A1, A2, A3 . . . and AN) may be coupled together, to the same node of the output inductor of the corresponding power converter (for example, output inductor L110). In some aspects of the disclosure herein, all output terminals OUT of each circuit of the same power converter (e.g., A1, A2, A3 . . . and AN) may be coupled to mutually coupled inductors (e.g., coupled inductors L4, L5, L6 of FIG. 2), each of which is connected to an output inductor (e.g., differential filter), similar to output inductor L7 of FIG. 2.

In some aspects, circuit 111 may function as a single-phase power converter. For example, circuit 111 may replace each of the single-phase converter circuits 91, 92 and 93.

Figure 12:
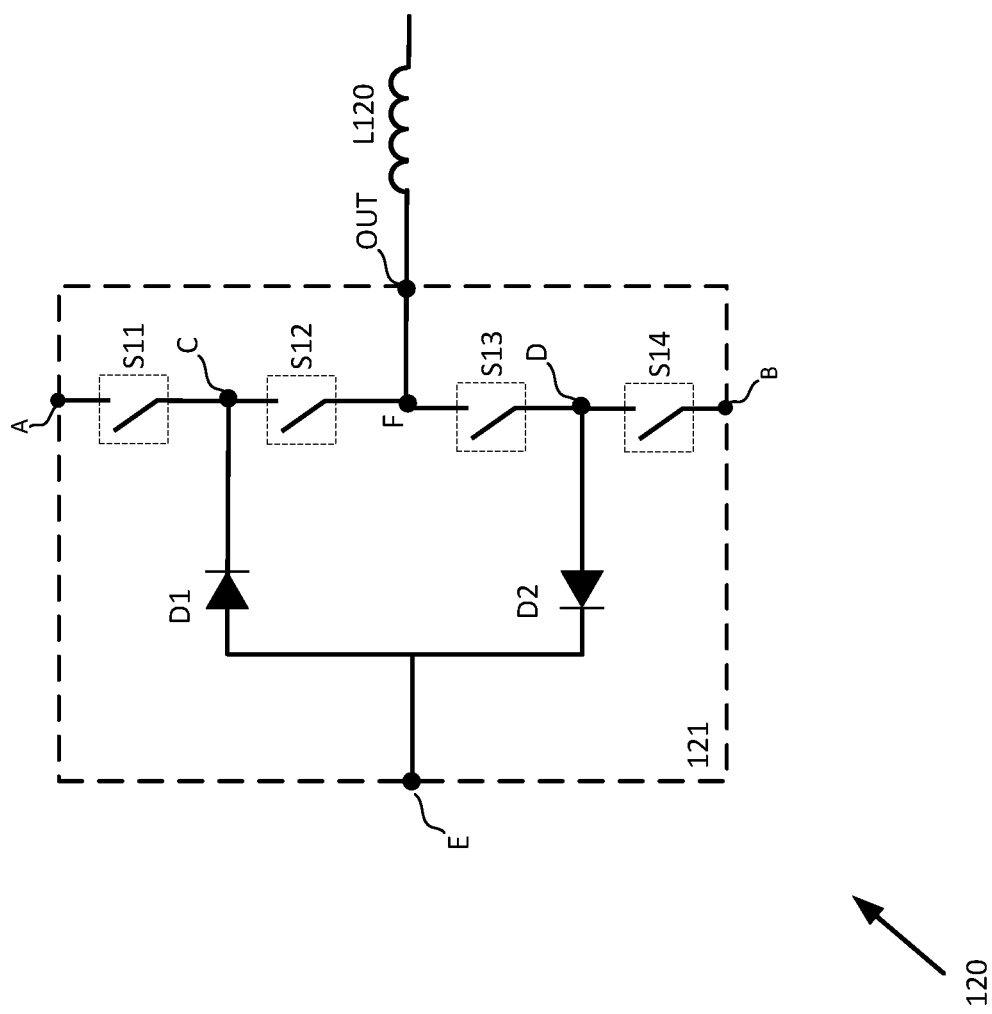
FIG. 12 illustrates a diagram of an electrical circuit according to aspects of the disclosure.

Reference is made to FIG. 12, which illustrates a circuit diagram of an electrical circuit (e.g., power converter) 120. Electrical circuit 120 comprises circuit 121, which may be an example of circuits F1, F2, F3 . . . and FN, circuits G1, G2, G3 . . . and GN, H1, H2, H3 . . . and HN of FIG. 9, according to aspects of the disclosure. In some aspects, circuit 121 may be a neutral-point-clamped (e.g. NPC) converter.

Circuit 120 includes electrical circuit (e.g., power converter) 121 and output inductor L120. Circuit 121 includes: a plurality of S11, S12, S13, and S14, and diodes D1, and D2.

Electrical circuit 121 may be connected across input terminals A and B. (e.g., similar to input terminals A and B of FIG. 10). Electrical circuit 121 may be configured to connect to node E, which may be an intermediate node (e.g., the point of connection) between capacitors C1 and C2 of FIG. 9. In some embodiments, node E may be coupled to neutral and/or earth potential.

Electrical circuit 121 may convert the input direct-current (e.g., DC) voltage across input terminals A and B to an output alternating-current (e.g., AC) voltage at a first frequency (e.g., 50/60 Hz) at terminal OUT. Output inductor L120 may be connected to terminal OUT.

The plurality of switches may be connected across input terminals A and B. A first terminal of switch S11 may be coupled to input terminal A and a second terminal of switch S11 may be coupled to node C. A first terminal of switch S12 may be coupled to node C and a second terminal of switch S12 may be coupled to node F. A first terminal of switch S13 may be coupled to node F and a second terminal of switch S13 may be coupled to node D. A first terminal of switch S14 may be coupled to node D and a second terminal of switch S14 may be coupled to input terminal B.

The anode of the first diode D1 may be coupled to node E and the cathode of the first diode D1 may be coupled to node C. The anode of the second diode D2 may be coupled to node D, and the cathode of the second diode D2 may be coupled to node E.

Switches S12 and S13 of the plurality of switches may be switched by a controller (e.g., controller 990 of FIG. 9) at a first frequency. The first frequency may be the output frequency of the voltage at terminal OUT of electrical circuit 121 in FIG. 12. Switches S12 and S13 may be switched in a complementary manner. For example, during the positive half-cycle of the output voltage at terminal OUT, switch S12 may be ON and switch S13 may be OFF. During the negative half-cycle of the output voltage at terminal OUT, switch S13 may be ON and switch S12 may be OFF.

Switches S11 and S14 of the plurality of switches may be switched by a controller (e.g., controller 990 of FIG. 9) at a second frequency. The second frequency may be higher than the output frequency of the voltage at terminal OUT of electrical circuit 121 in FIG. 12.

During the positive half-cycle of the output voltage at terminal OUT, switch S11 may be switched according to the duty-cycle ratio D of the output voltage. During the positive half-cycle of the output voltage at terminal OUT, switch S14 may be turned OFF. Thus, during the positive half-cycle, the first diode D1 may conduct in a complementary manner with respect to switch S11, e.g., at 1-D.

During the negative half-cycle of the output voltage at terminal OUT, switch S14 may be switched according to the duty-cycle ratio D of the output voltage. During the negative half-cycle of the output voltage at terminal OUT, switch S11 may be turned OFF. Thus, during the negative half-cycle, the second diode D2 may conduct in a complementary manner with respect to switch S14, e.g., at 1-D.

In a case where circuit 121 is used for each of circuits F1, F2, F3 . . . and FN, circuits G1, G2, G3 . . . and GN, H1, H2, H3 . . . and HN of FIG. 9, all output terminals OUT of each circuit of the same power converter (e.g., F1, F2, F3 . . . and FN of power converter 96) may be coupled together, to the same node of the output inductor of the corresponding power converter (for example, output inductor L120).

In a case where circuit 121 is used for each of circuits F1, F2, F3 . . . and FN, circuits G1, G2, G3 . . . and GN, H1, H2, H3 . . . and HN of FIG. 9, each circuit of the same power converter (e.g., F1, F2, F3 . . . and FN of power converter 96) may be shifted sequentially by 1/N (where N is the number of circuits in the power converter) of the switching period of the second frequency. In addition, each circuit of each power converter may be shifted sequentially by 1/N*P (where P is the number of single-phase power converters, and N is the number of circuits in the power converter) of the switching period of the second frequency.

In some aspects of the disclosure herein, all output terminals OUT of each circuit of the same power converter (e.g., F1, F2, F3 . . . and FN of power converter 96) may be coupled to mutually coupled inductors (e.g., coupled inductors L4, L5, L6 of FIG. 2), each of which is connected to an output inductor (e.g., differential filter), similar to output inductor L7 of FIG. 2.

Figure 13:
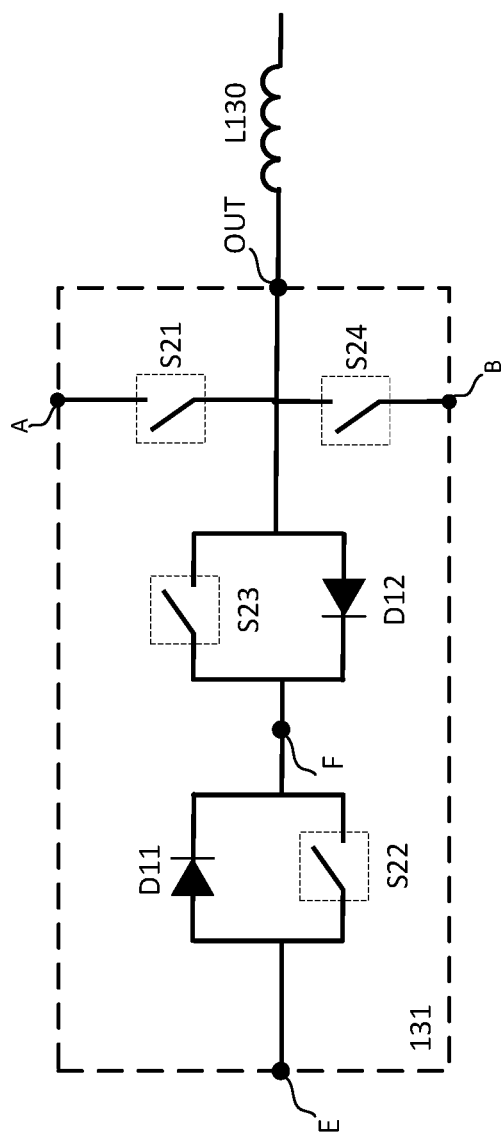
FIG. 13 illustrates a diagram of an electrical circuit according to aspects of the disclosure.

Reference is made to FIG. 13, which illustrates a circuit diagram of an electrical circuit (e.g., power converter) 130. Electrical circuit 130 comprises circuit 131, which may be an example of circuits F1, F2, F3 . . . and FN, circuits G1, G2, G3 . . . and GN, H1, H2, H3 . . . and HN of FIG. 9, according to aspects of the disclosure. In some aspects, circuit 131 may be a T-type neutral-point-clamped (e.g. TNPC) converter.

Circuit 130 includes electrical circuit (e.g., power converter) 131 and output inductor L130. Circuit 131 includes: a plurality of switches S21, S22, S23, and S24, and two diodes D11 and D12.

Electrical circuit 131 may be connected across input terminals A and B. (e.g., similar to input terminals A and B of FIG. 10). Electrical circuit 131 may be configured to connect to node E, which may be an intermediate node (e.g., the point of connection) between capacitors C1 and C2 of FIG. 9. In some embodiments, node E may be coupled to neutral and/or earth potential.

Electrical circuit 131 may convert the input direct-current (e.g., DC) voltage across input terminals A and B to an output alternating-current (e.g., AC) voltage at a first frequency (e.g., 50/60 Hz) at terminal OUT. Output inductor L130 may be connected to terminal OUT.

A first terminal of switch S21 may be coupled to input terminal A and a second terminal of switch S21 may be coupled to terminal OUT. A first terminal of switch S22 may be coupled to node E and a second terminal of switch S22 may be coupled to node F. A first terminal of switch S23 may be coupled to node F and a second terminal of switch S23 may be coupled to terminal OUT. A first terminal of switch S24 may be coupled to terminal OUT and a second terminal of switch S24 may be coupled to input terminal B. Diode D11 may be coupled in parallel with switch S22, where the anode of D11 may be coupled to node E, and the cathode of D11 may be coupled to node F. Diode D12 may be coupled in parallel with switch S23, where the anode of D12 may be coupled to terminal OUT, and the cathode of D12 may be coupled to node F.

Switches S22 and S23 of the plurality of switches may be switched by a controller (e.g., controller 990 of FIG. 9) at a first frequency. The first frequency may be the output frequency of the voltage at terminal OUT. Switches S22 and S23 may be switched in a complementary manner. For example, during the positive half-cycle of the output voltage at terminal OUT, switch S23 may be ON and switch S22 may be OFF. During the negative half-cycle of the output voltage at terminal OUT, switch S22 may be ON and switch S23 may be OFF.

Switches S21 and S24 may be switched by a controller (e.g., controller 990 of FIG. 9) at a second frequency. The second frequency may be higher than the output frequency of the voltage at terminal OUT.

During the positive half-cycle of the output voltage at terminal OUT, switch S21 may be switched according to the duty-cycle ratio D of the output voltage. During the positive half-cycle of the output voltage at terminal OUT, switch S24 may be turned OFF. Thus, during the positive half-cycle, diode D11 may conduct in a complementary manner with respect to switch S21, e.g., at 1-D.

During the negative half-cycle of the output voltage at terminal OUT, switch S24 may be switched according to the duty-cycle ratio D of the output voltage. During the negative half-cycle of the output voltage at terminal OUT, switch S21 may be turned OFF. Thus, during the negative half-cycle, diode D12 may conduct in a complementary manner with respect to switch S24, e.g., at 1-D.

In a case where circuit 131 is used for each of circuits F1, F2, F3 . . . and FN, circuits G1, G2, G3 . . . and GN, H1, H2, H3 . . . and HN of FIG. 9, all output terminals OUT of each circuit of the same power converter (e.g., F1, F2, F3 . . . and FN of power converter 96) may be coupled together, to the same node of the output inductor of the corresponding power converter (for example, output inductor L130).

In a case where circuit 131 is used for each of circuits F1, F2, F3 . . . and FN, circuits G1, G2, G3 . . . and GN, H1, H2, H3 . . . and HN of FIG. 9, each circuit of the same power converter (e.g., F1, F2, F3 . . . and FN of power converter 96) may be shifted sequentially by 1/N (where N is the number of circuits in the power converter) of the switching period of the second frequency. In addition, each circuit of each power converter may be shifted sequentially by 1/N*P (where P is the number of single-phase power converters, and N is the number of circuits in the power converter) of the switching period of the second frequency.

In some aspects of the disclosure herein, all output terminals OUT of each circuit of the same power converter (e.g., F1, F2, F3 . . . and FN of power converter 96) may be coupled to mutually coupled inductors (e.g., coupled inductors L4, L5, L6 of FIG. 2), each of which is connected to an output inductor (e.g., differential filter), similar to output inductor L7 of FIG. 2.

Figure 14:
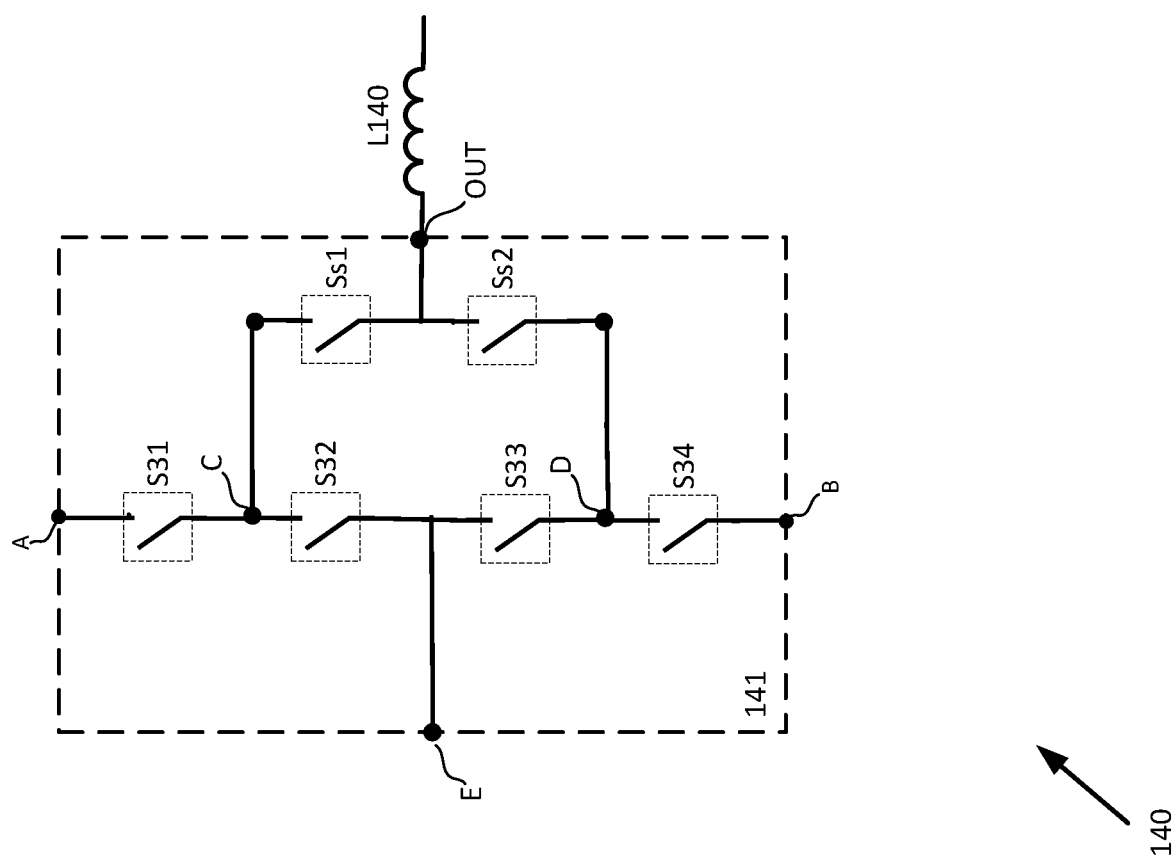
FIG. 14 illustrates a diagram of an electrical circuit according to aspects of the disclosure.

Reference is made to FIG. 14, which illustrates a circuit diagram of an electrical circuit (e.g., power converter) 140. Electrical circuit 140 comprises circuit 141, which may be an example of circuits F1, F2, F3 . . . and FN, circuits G1, G2, G3 . . . and GN, H1, H2, H3 . . . and HN of FIG. 9, according to aspects of the disclosure. In some aspects, circuit 141 may be an active neutral—point clamped (e.g., ANPC) converter.

Circuit 140 includes electrical circuit (e.g., power converter) 141 and output inductor L140. Circuit 141 includes: a first plurality of switches S31, S32, S33, and S34, and a second plurality of switches Ss1 and Ss2.

Electrical circuit 141 may be connected across input terminals A and B. (e.g., similar to input terminals A and B of FIG. 10). Electrical circuit 141 may be configured to connect to node E, which may be an intermediate node (e.g., the point of connection) between capacitors C1 and C2 of FIG. 9. In some embodiments, node E may be coupled to neutral and/or earth potential.

Electrical circuit 141 may convert the input direct-current (e.g., DC) voltage across input terminals A and B to an output alternating-current (e.g., AC) voltage at a first frequency (e.g., 50/60 Hz) at terminal OUT. Output inductor L140 may be connected to terminal OUT.

A first terminal of switch S31 may be coupled to input terminal A and a second terminal of switch S31 may be coupled to node C. A first terminal of switch S32 may be coupled to node E and a second terminal of switch S32 may be coupled to node C. A first terminal of switch S33 may be coupled to node E and a second terminal of switch S33 may be coupled to node D. A first terminal of switch S34 may be coupled to node D and a second terminal of switch S34 may be coupled to input terminal B.

The first plurality of switches S31, S32, S33, and S34 may be switched by a controller (e.g., controller 990 of FIG. 9) at a first frequency. The first frequency may be the output frequency of the voltage at terminal OUT. Switches S31 and S33 may be switched at the same time (e.g. simultaneously). Switches S32 and S34 may be switched in a complementary manner with respect to switches S31 and S33. For example, during the positive half-cycle of the output voltage at terminal OUT, switches S31 and S33 may be ON and switches S32 and S34 may be OFF. During the negative half-cycle of the output voltage at terminal OUT, switches S32 and S34 may be ON and S31 and S33 may be OFF.

Switches Ss1 and Ss2 may be switched by a controller (e.g., controller 990 of FIG. 9) at a second frequency. The second frequency may be higher than the output frequency of the voltage at terminal OUT.

During the positive half-cycle of the output voltage at terminal OUT, switch Ss1 may be switched according to the duty-cycle ratio D of the output voltage. During the positive half-cycle of the output voltage at terminal OUT, switch Ss2 may be switched in a complementary manner with respect to switch Ss1, e.g., at 1-D.

During the negative half-cycle of the output voltage at terminal OUT, switch Ss2 may be switched according to the duty-cycle ratio D of the output voltage. During the negative half-cycle of the output voltage at terminal OUT, switch Ss1 may be switched in a complementary manner with respect to switch Ss2, e.g., at 1-D.

In a case where circuit 141 is used for each of circuits F1, F2, F3 . . . and FN, circuits G1, G2, G3 . . . and GN, H1, H2, H3 . . . and HN of FIG. 9, all output terminals OUT of each circuit of the same power converter (e.g., F1, F2, F3 . . . and FN of power converter 96) may be coupled together, to the same node of the output inductor of the corresponding power converter (for example, output inductor L140).

In a case where circuit 141 is used for each of circuits F1, F2, F3 . . . and FN, circuits G1, G2, G3 . . . and GN, H1, H2, H3 . . . and HN of FIG. 9, each circuit of the same power converter (e.g., F1, F2, F3 . . . and FN of power converter 96) may be shifted sequentially by 1/N (where N is the number of circuits in the power converter) of the switching period of the second frequency. In addition, each circuit of each power converter may be shifted sequentially by 1/N*P (where P is the number of single-phase power converters, and N is the number of circuits in the power converter) of the switching period of the second frequency.

In some aspects of the disclosure herein, all output terminals OUT of each circuit of the same power converter (e.g., F1, F2, F3 . . . and FN of power converter 96) may be coupled to mutually coupled inductors (e.g., coupled inductors L4, L5, L6 of FIG. 2), each of which is connected to an output inductor (e.g., differential filter), similar to output inductor L7 of FIG. 2.

In some aspects of the disclosure herein, in case where a power converter (e.g., power converter 96 comprising F1, F2, F3 . . . and FN) comprises a plurality of parallel-connected circuits of circuit 141, the first plurality of switches S31, S32, S33, and S34 may be used for each of the parallel-connected circuits. For example, circuit 10 of FIG. 1 is an example for a power converter comprising N parallel-connected circuits, similar to circuit 141. The series connection of switches Sa1, Sa2, Sa3 and Sa4 may be common to each of the N parallel-connected circuits. The use of common switches, while achieving the same functionality, may reduce the size and cost of circuit 10.

Figure 15:
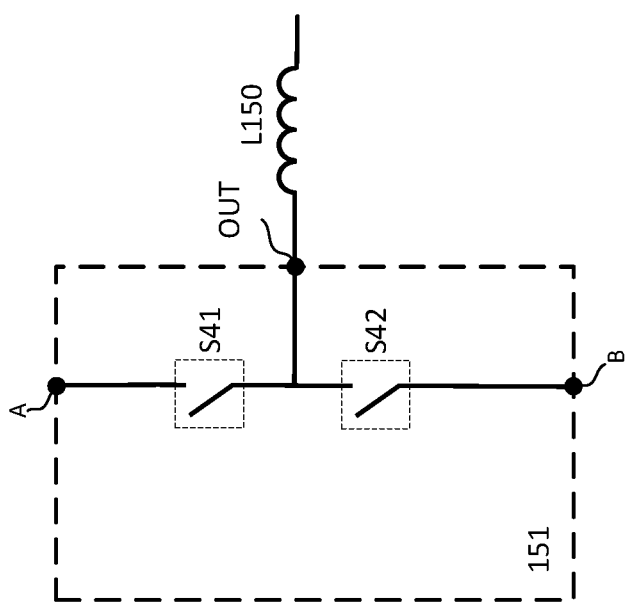
FIG. 15 illustrates a diagram of an electrical circuit according to aspects of the disclosure.

Reference is made to FIG. 15, which illustrates a circuit diagram of an electrical circuit (e.g., power converter) 150. Electrical circuit 150 comprises circuit 151, which is an example of each of circuits A1, A2, A3 . . . and AN, B1, B2, B3 . . . and BN, and C1, C2, C3 . . . and CN of FIG. 10, according to aspects of the disclosure. In some aspects, circuit 151 may be a half-bridge converter.

Circuit 150 includes electrical circuit (e.g., power converter) 151 and output inductor L150. Circuit 151 includes: switches S41 and S42.

Electrical circuit 151 may be connected across input terminals A and B. (e.g., similar to input terminals A and B of FIG. 10). Electrical circuit 151 may convert the input direct-current (e.g., DC) voltage across input terminals A and B to an output alternating-current (e.g., AC) voltage at terminal OUT. Output inductor L150 may be connected to terminal OUT.

Switches S41 and S42 may be series-connected across input terminals A and B. A first terminal of switch S41 may be coupled to input terminal A and a second terminal of switch S41 may be coupled to terminal OUT. A first terminal of switch S42 may be coupled to terminal OUT and a second terminal of switch S42 may be coupled to input terminal B.

Switches S41 and S42 may be switched by a controller (e.g., controller 980 of FIG. 10) in a complementary manner at a second frequency and according to a duty-cycle ratio of the output voltage at terminal OUT. The second frequency may be higher than the first frequency. For example, during the positive half-cycle of the output voltage at terminal OUT, switch S41 may be switched at a duty-cycle ratio D of the output voltage at terminal OUT, while switch S42 may be switched at 1-D. When switch S41 is OFF, switch S42 may be ON, and vice versa. During the negative half-cycle of the output voltage at terminal OUT, switch S42 may be switched at the duty-cycle ratio D of the output voltage at terminal OUT, while switch S41 may be switched at 1-D.

In a case where circuit 151 is used for each of circuits A1, A2, A3 . . . and AN, B1, B2, B3 . . . and BN, and C1, C2, C3 . . . and CN of FIG. 10, all output terminals OUT of each circuit of the same power converter (e.g., A1, A2, A3 . . . and AN) may be coupled together, to the same node of the output inductor of the corresponding power converter (for example, output inductor L150). In some aspects of the disclosure herein, all output terminals OUT of each circuit of the same power converter (e.g., A1, A2, A3 . . . and AN) may be coupled to mutually coupled inductors (e.g., coupled inductors L4, L5, L6 of FIG. 2), each of which is connected to an output inductor (e.g., differential filter), similar to output inductor L7 of FIG. 2.

In some aspects, circuit 151 may function as a single-phase power converter. For example, circuit 151 may replace each of the single-phase converter circuits 91, 92 and 93 in FIG. 10.

It is to be understood that the inventions are not limited in application to the details set forth in the description contained herein or illustrated in the drawings. Other examples of the inventions are contemplated and the inventions are capable of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

Those skilled in the art will readily appreciate that various modifications and changes can be applied to the examples as hereinbefore described without departing from the scope, defined in and by the appended claims, of the disclosure. Further, various modifications should be readily appreciated from the following paragraphs describing various combinations of features set forth in numbered clauses.

Clause 1: A system comprising:

a direct current (DC) power source configured to supply a DC voltage across a pair of input terminals; and an apparatus comprising:

a first plurality of power converters comprising P power converters, wherein each power converter of the first plurality of power converters is coupled to the pair of input terminals and configured to convert the DC voltage to an alternating-current (AC) voltage at a first frequency at a respective output terminal;

wherein each power converter of the first plurality of power converters comprises a second plurality of electrical circuits comprising N electrical circuits; and wherein each electrical circuit of the second plurality of electrical circuits is configured to switch based on one of a plurality of control signals having a second frequency, wherein each of the plurality of control signals is phase shifted, by 1/(N*P) of a switching period of the second frequency, with respect to another control signal of the plurality of control signals and phase shifted, by 1/N of the switching period of the second frequency, with respect to another control signal, of the plurality of control signals, for another electrical circuit of the same power converter.

Clause 2: A system comprising:
a direct current (DC) power source configured to supply a DC voltage across a pair of input terminals; and an apparatus comprising:
a first plurality of power converters comprising P power converters, wherein each power converter of the first plurality of power converters is coupled to the pair of input terminals and configured to convert the DC voltage to an alternating-current (AC) voltage at a first frequency at a respective output terminal;
wherein each power converter of the first plurality of power converters comprises a second plurality of electrical circuits comprising N electrical circuits; and
wherein each electrical circuit of the second plurality of electrical circuits is configured to switch based on one of a plurality of control signals having a second frequency, wherein each of the plurality of control signals is phase shifted, by 1/(N*P) of a switching period of the second frequency, with respect to another control signal of the plurality of control signals.

Clause 3: A system comprising:
a direct current (DC) power source configured to supply a DC voltage across a pair of input terminals; and an apparatus comprising:
a first plurality of power converters comprising P power converters, wherein each power converter of the first plurality of power converters is coupled to the pair of input terminals and configured to convert the DC voltage to an alternating-current (AC) voltage at a first frequency at a respective output terminal;
wherein each power converter of the first plurality of power converters comprises a second plurality of electrical circuits comprising N parallel-connected electrical circuits; and
wherein each parallel-connected electrical circuit of the second plurality of parallel-connected electrical circuits is configured to switch based on one of a plurality of control signals having a second frequency, wherein each of the plurality of control signals is phase shifted, by 1/(N*P) of a switching period of the second frequency, with respect to another control signal of the plurality of control signals.

Clause 4: The apparatus of any one of clauses 1 or 2 or 3, wherein each power converter of the first plurality of power converters is coupled a third input terminal.

Clause 5: The apparatus of clause 4, wherein the third input terminal is coupled to at least one of a neutral potential, an earth potential, or the first terminal.

Clause 6: The apparatus of any one of clauses 1 or 2 or 3, wherein a capacitor is coupled between the pair of input terminals.

Clause 7: The apparatus of any one of clauses 1 or 2 or 3, wherein a plurality of series-connected capacitors is connected across the pair of input terminals.

Clause 8: The apparatus of any one of clauses 1 or 2 or 3, further comprising one or more inductors coupled to a respective output terminal.

Clause 9: The apparatus of any one of clauses 1 or 2 or 3, wherein each power converter of the first plurality of power converters provides a single phase output with respect to at least one of a neutral potential, an earth potential, or the first terminal.

Clause 10: The apparatus of any one of clauses 1 or 2 or 3, wherein a first inductor for a first electrical circuit of the second plurality of electrical circuits is configured to have mutual inductance with at least a second inductor for a second electrical circuit of the second plurality of electrical circuits.

Clause 11: The apparatus of any one of clauses 1 or 2 or 3, wherein at least one electrical circuit of the second plurality of electrical circuits comprises a switch.

Clause 12: The apparatus of any one of clauses 1 or 2 or 3, wherein at least one electrical circuit of the second plurality of electrical circuits comprises two or more switches.

Clause 13: The apparatus of any one of clauses 1 or 2 or 3, wherein at least one electrical circuit of the second plurality of electrical circuits comprises a plurality of series-connected switches.

Clause 14: The apparatus of clause 11, further comprising a controller configured to control the switch.

Clause 15: The apparatus of clause 12, further comprising a controller configured to control the two or more switches.

Clause 16: The apparatus of clause 13, further comprising a controller configured to control plurality of series-connected switches.

Clause 17: The apparatus of any of clauses 14 or 15 or 16, wherein the controller is configured to switch a first switch in a complementary manner with respect to a second switch.

Clause 18: The apparatus of any of the preceding clauses, wherein the controller is configured to switch each parallel-connected electrical circuit of the second plurality of parallel-connected electrical circuits in a phase-shifted manner with respect to each other.

Clause 19: The apparatus of any of the preceding clauses, wherein the controller is configured to switch each electrical circuit of the second plurality of electrical circuits in a phase-shifted manner with respect to each other.

Clause 20: The apparatus of any of the preceding clauses, wherein the controller is configured to switch one of the switch, series-connected switches, or the two or more switches, based on a duty cycle ratio.

Clause 21: The apparatus of any of the preceding clauses, further comprising a relay connected between at least one of the one or more inductors and the output terminal.

Clause 22: A method comprising:
converting, by a power converter of a first plurality of P power converters, a DC voltage, received across a pair of input terminals, to an alternating-current (AC) voltage at a first frequency at a respective output terminal, wherein each power converter of the first plurality of the P power converters comprises a second plurality of electrical circuits comprising N electrical circuits; and
switching (e.g., sequentially shifting) the second plurality of electrical circuits based on a plurality of control signals having a second frequency, wherein each of the plurality of control signals is phase shifted, by 1/(N*P) of a switching period of the second frequency, with respect to another control signal of the plurality of control signals.

Clause 23: A method comprising:
converting, by a power converter of a first plurality of P power converters, each comprising a second plurality of electrical circuits comprising N electrical circuits, a DC voltage, received across a pair of input terminals, to an alternating-current (AC) voltage at a first frequency at a respective output terminal; and controlling each electrical circuit of the second plurality of electrical circuits based on a plurality of signal having a second frequency, wherein each of the plurality of signals is phase shifted, by 1/(N*P) of a switching period of the second frequency, with respect to another signal of the plurality of signals and phase shifted, by 1/N of the switching period of the second frequency, with respect to another signal, of the plurality of signals, for another electrical circuit of the same power converter.

Clause 24: A method comprising:

converting, by a power converter of a first plurality of P power converters, each comprising a second plurality of series-connections of switches comprising N series-connections of switches, a DC voltage, received across a pair of input terminals, to an alternating-current (AC) voltage at a first frequency at a respective output terminal; and controlling each of the series-connections of switches based on a plurality of signals having a second frequency, wherein each of the plurality of signals is phase shifted, by 1/(N*P) of a switching period of the second frequency, with respect to another signal of the plurality of signals and phase shifted, by 1/N of the switching period of the second frequency, with respect to another signal, of the plurality of signals, for another series-connection of switches of the same power converter.

The method of any one of clauses 22 or 23 or 24, further comprising one or more features of any of clauses 1-21.

The invention claimed is:

1. An apparatus comprising:
   a pair of input terminals configured to supply a direct current (DC) voltage;
   a first series connection comprising a first capacitor and a second capacitor, wherein the first series connection is connected across the pair of input terminals, and the first capacitor is connected to the second capacitor at a first terminal;
   a controller; and
   a plurality of power converters, wherein each power converter of the plurality of power converters is coupled to the pair of input terminals and configured to convert the DC voltage to an alternating-current (AC) voltage at a first output frequency at a respective output terminal;
   wherein each power converter of the plurality of power converters comprises:
      a second series connection comprising a first switch, a second switch, a third switch and a fourth switch, wherein the second series connection is connected across the pair of input terminals, wherein the first switch is connected to the second switch at a second terminal, wherein the second switch is connected to the third switch at a third terminal, wherein the third switch is connected to the fourth switch at a fourth terminal; and
      a plurality of circuits, wherein each circuit of the plurality of circuits comprises:
         an additional series connection comprising two or more switches across the second terminal and the fourth terminal and an intermediate node between the two or more switches of the additional series connection; and
         a first leg comprising an inductor having mutual inductance with another inductor of a second leg, wherein the first leg is connected between the intermediate node and an output terminal; and wherein the controller is configured to control, based on one or more current measurements for a first inductor of a first circuit of the plurality of circuits or a second inductor of a second circuit of the plurality of circuits, a first current of the first inductor or a second current of the second inductor to balance the first current with the second current.

2. The apparatus of claim 1, wherein the first terminal is connected to the third terminal.

3. The apparatus of claim 1, wherein the output terminal provides a single phase output with respect to at least one of a neutral potential, an earth potential, or the first terminal.

4. The apparatus of claim 1, wherein the controller is configured to switch the first switch, the second switch, the third switch, and the fourth switch of each power converter of the plurality of power converters at a first switching frequency, and to switch, based on one of a plurality of control signals, each circuit of the plurality of circuits at a second switching frequency.

5. The apparatus of claim 4, wherein each of the plurality of control signals is phase shifted, by 1/(N*P) of a switching period of the second switching frequency, with respect to another control signal of the plurality of control signals, where N is the number of the plurality of circuits and P is the number of the plurality of power converters.

6. The apparatus of claim 5, wherein each of the plurality of control signals is phase shifted, by 1/N of the switching period of the second switching frequency, with respect to another control signal, of the plurality of control signals, for another circuit of the plurality of circuits of a same power converter of the plurality of power converters.

7. The apparatus of claim 4, wherein the controller is configured to switch the first switch of the corresponding power converter of the plurality of power converters, in correspondence with the third switch of the corresponding power converter, and in a complementary manner with respect to the second switch of the corresponding power converter.

8. The apparatus of claim 4, wherein the two or more switches of the additional series connection comprises a fifth switch and a sixth switch, and
   wherein the controller is configured to switch the fifth switch and the sixth switch in a complementary manner.

9. The apparatus of claim 4, wherein the controller is configured to switch a circuit of the plurality of circuits of the plurality of power converters in a phase-shifted manner, by 1/(N*P) of a switching period of the second switching frequency, with respect to another circuit of the plurality of circuits of the plurality of power converters, where N is the number of the plurality of circuits and P is the number of the plurality of power converters.

10. The apparatus of claim 4, wherein the controller is configured to switch the two or more switches of the additional series connection, based on a duty cycle ratio.

11. The apparatus of claim 1, wherein each leg of the plurality of circuits further comprises a relay; and
   wherein the:
      a controller is configured to open or close at least one relay based on an output of a sensor configured to measure a current of at least one inductor of a same leg that comprises the at least one relay.

12. The apparatus of claim 1, wherein the controller is configured to receive the one or more current measurements from one or more sensors and to control the first current of the first inductor or the second current of the second inductor to balance the first current with the second current by changing one or more pulse width modulation signals.

13. The apparatus of claim 1, wherein the first series connection comprises a third capacitor connected in parallel with or in series with the first capacitor across the pair of input terminals.

14. A system comprising:
a direct current (DC) power source configured to supply a DC voltage across a pair of input terminals;
a first series connection comprising a first capacitor and a second capacitor, wherein the first series connection is connected across the pair of input terminals, and the first capacitor is connected to the second capacitor at a first terminal;
a plurality of power converters, wherein each power converter of the plurality of power converters is coupled to the pair of input terminals and configured to convert the DC voltage to an alternating-current (AC) voltage at a first output frequency at a respective output terminal; and
a controller;
wherein each power converter of the plurality of power converters comprises:
a second series connection comprising a first switch, a second switch, a third switch and a fourth switch, wherein the second series connection is connected across the pair of input terminals, wherein the first switch is connected to the second switch at a second terminal, wherein the second switch is connected to the third switch at a third terminal, wherein the third switch is connected to the fourth switch at a fourth terminal; and
a plurality of circuits, wherein each circuit of the plurality of circuits comprises an additional series connection comprising two or more switches across the second terminal and the fourth terminal and an intermediate node between the two or more switches of the additional series connection; and
wherein the controller is configured to:
switch the first switch, the second switch, the third switch, and the fourth switch of each power converter of the plurality of power converters at a first switching frequency;
switch, based on one of a plurality of control signals, each circuit of the plurality of circuits at a second switching frequency; and
switch a circuit of the plurality of circuits in a phase-shifted manner, by 1/(N*P) of a switching period of the second switching frequency, with respect to another circuit of the plurality of circuits, where N is the number of the plurality of circuits and P is the number of the plurality of power converters.

15. The system of claim 14, wherein the first terminal is connected to the third terminal.

16. The system of claim 14, wherein each circuit of the plurality of circuits further comprises:
a first leg comprising an inductor having mutual inductance with another inductor of a second leg of a same power converter, wherein the second leg is connected between the intermediate node of the same circuit and an output terminal.

17. The system of claim 16, wherein each leg of the plurality of circuits further comprises a relay; and
wherein the controller is configured to open or close at least one relay based on an output of a sensor configured to measure a current of at least one inductor of a same leg that comprises the at least one relay.

18. The system of claim 14, wherein the controller is further configured to control, based on one or more current measurements for a first inductor of a first circuit of the plurality of circuits or a second inductor of a second circuit of the plurality of circuits, a first current of the first inductor or a second current of the second inductor to balance the first current with the second current.

19. The system of claim 18, wherein the controller is configured to receive the one or more current measurements from one or more sensors and to control the first current of the first inductor or the second current of the second inductor to balance the first current with the second current by changing one or more pulse width modulation signals.

20. The system of claim 14, wherein the first series connection comprises a third capacitor connected in parallel with or in series with the first capacitor across the pair of input terminals.

* * * * *